US010097129B2

(12) United States Patent
Koseki et al.

(10) Patent No.: US 10,097,129 B2
(45) Date of Patent: Oct. 9, 2018

(54) DRIVE CONTROLLER AND DRIVE CONTROL METHOD FOR ELECTRIC MOTOR

(71) Applicant: HITACHI AUTOMOTIVE SYSTEMS, LTD., Hitachinaka-shi, Ibaraki (JP)

(72) Inventors: Tomonobu Koseki, Isesaki (JP); Tomishige Yatsugi, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 15/119,838

(22) PCT Filed: Jan. 21, 2015

(86) PCT No.: PCT/JP2015/051555
§ 371 (c)(1),
(2) Date: Aug. 18, 2016

(87) PCT Pub. No.: WO2015/125543
PCT Pub. Date: Aug. 27, 2015

(65) Prior Publication Data
US 2017/0070178 A1    Mar. 9, 2017

(30) Foreign Application Priority Data
Feb. 19, 2014  (JP) ................................ 2014-029411

(51) Int. Cl.
*H02P 29/02*    (2016.01)
*H02P 27/04*    (2016.01)
(Continued)

(52) U.S. Cl.
CPC .......... *H02P 29/028* (2013.01); *B60L 3/0061* (2013.01); *B60L 15/2009* (2013.01);
(Continued)

(58) Field of Classification Search
CPC .... B62D 5/0487; B62D 5/0484; B62D 5/046; B62D 5/0463; B62D 5/049; B62D 5/0403;
(Continued)

(56) References Cited

U.S. PATENT DOCUMENTS 7,406,375 B2 *  7/2008  Fujita ................... B62D 5/0463
                                                  180/446
7,459,879 B2 * 12/2008  Kezobo .................. B62D 5/046
                                                  318/727
(Continued)

FOREIGN PATENT DOCUMENTS

JP    2009-195026 A    8/2009
JP    2009-278790 A   11/2009
(Continued)

OTHER PUBLICATIONS

International Search Report and Written Opinion of the International Searching Authority dated Mar. 31, 2015 in International Application No. PCT/JP2015/051555.
(Continued)

*Primary Examiner* — Bentsu Ro
(74) *Attorney, Agent, or Firm* — Foley & Lardner LLP

(57) ABSTRACT

To provide drive controller and control method for an electric motor including plural energization systems composed of an inverter and coils corresponding to plural phases. The controller includes: a current detecting unit for detecting currents between the coils and output points of the inverter or between the coils and a connection point between the coils; an inverter setting unit for controlling an inverter of the energization system involving abnormal energization into a predetermined condition; a torque detecting unit for detecting a torque generated in the energization system involving the abnormal energization based on a current in the energization system, which is detected by the current
(Continued)

detecting unit; and a control unit for controlling a normal inverter based on the torque detected by the torque detecting unit. This configuration enhances the performance of controlling the electric motor in case a braking torque is generated due to abnormal energization.

15 Claims, 19 Drawing Sheets

(51) Int. Cl.
| | |
|---|---|
| H02P 29/028 | (2016.01) |
| H02P 27/06 | (2006.01) |
| H02P 25/22 | (2006.01) |
| B60L 3/00 | (2006.01) |
| B60L 15/20 | (2006.01) |
| H02H 7/122 | (2006.01) |
| H02P 29/032 | (2016.01) |
| B62D 5/04 | (2006.01) |
| H02P 27/08 | (2006.01) |

(52) U.S. Cl.
CPC ......... *B62D 5/0463* (2013.01); *B62D 5/0481* (2013.01); *H02H 7/122* (2013.01); *H02P 25/22* (2013.01); *H02P 27/06* (2013.01); *H02P 27/08* (2013.01); *H02P 29/032* (2016.02); *B60L 2210/40* (2013.01); *B60L 2220/54* (2013.01); *B60L 2240/423* (2013.01); *B60L 2240/429* (2013.01); *B60L 2240/526* (2013.01); *B60L 2240/529* (2013.01); *Y02T 10/641* (2013.01); *Y02T 10/644* (2013.01); *Y02T 10/645* (2013.01); *Y02T 10/7241* (2013.01); *Y02T 10/7275* (2013.01)

(58) Field of Classification Search
CPC ...... B62D 5/0481; B62D 5/0472; B62D 5/04; B62D 5/0409; B62D 5/0493; B62D 6/00; H02P 29/032; H02P 25/22; H02P 29/0241
USPC .................................................. 318/432, 599
See application file for complete search history.

(56) References Cited

U.S. PATENT DOCUMENTS

| | | | | |
|---|---|---|---|---|
| 7,791,293 B2* | 9/2010 | Nagase | ..................... | H02P 6/28 318/400.01 |
| 7,908,057 B2* | 3/2011 | Sawada | ................ | B62D 5/0472 180/421 |
| 7,990,093 B2* | 8/2011 | Kezobo | ................ | B62D 5/0484 318/432 |
| 8,232,756 B2* | 7/2012 | Yoshihara | ................ | B60K 6/48 318/430 |
| 8,421,388 B2* | 4/2013 | Mukai | ................... | B62D 5/0463 318/400.01 |
| 8,436,573 B2* | 5/2013 | Uryu | ..................... | B62D 5/046 318/400.01 |
| 8,680,808 B2* | 3/2014 | Mukai | ................... | B62D 5/0403 318/400.21 |
| 9,018,880 B2* | 4/2015 | Hayashi | .................. | H02P 25/22 318/400.27 |
| 2007/0176577 A1* | 8/2007 | Kezobo | .................. | B62D 5/046 318/807 |
| 2008/0017439 A1* | 1/2008 | Sawada | ................ | B62D 5/0472 180/446 |
| 2008/0066994 A1* | 3/2008 | Fujita | ................... | B62D 5/0463 180/446 |
| 2008/0067960 A1* | 3/2008 | Maeda | ................... | B62D 5/046 318/400.02 |
| 2009/0021207 A1* | 1/2009 | Kezobo | ................ | B62D 5/0484 318/798 |
| 2009/0079373 A1* | 3/2009 | Nagase | ................ | B62D 5/0487 318/400.22 |
| 2009/0133947 A1* | 5/2009 | Yoshihara | ................ | B60K 6/48 180/65.285 |
| 2010/0222968 A1* | 9/2010 | Kifuku | ................ | B62D 5/0493 701/42 |
| 2010/0263953 A1 | 10/2010 | Shimana | | |
| 2011/0074333 A1 | 3/2011 | Suzuki | | |
| 2011/0156627 A1* | 6/2011 | Nakamura | ........... | B62D 5/0403 318/400.22 |
| 2011/0156629 A1* | 6/2011 | Satou | ................... | B62D 5/0484 318/453 |
| 2011/0163708 A1* | 7/2011 | Mukai | ................... | B62D 5/0403 318/722 |
| 2011/0204839 A1* | 8/2011 | Mukai | ................... | B62D 5/0403 318/724 |
| 2011/0248657 A1* | 10/2011 | Endoh | ................... | B62D 5/0487 318/400.22 |
| 2011/0315469 A1* | 12/2011 | Uryu | ..................... | B62D 5/0463 180/443 |
| 2011/0315470 A1* | 12/2011 | Uryu | ..................... | B62D 5/0484 180/446 |
| 2011/0316466 A1* | 12/2011 | Uryu | ..................... | B62D 5/0484 318/490 |
| 2013/0090809 A1* | 4/2013 | Kuroda | ................ | B62D 5/0481 701/41 |
| 2013/0141953 A1* | 6/2013 | Nakamura | ........... | B60L 3/0038 363/74 |
| 2013/0179039 A1* | 7/2013 | Uryu | ..................... | B62D 5/0463 701/42 |
| 2013/0220727 A1* | 8/2013 | Suzuki | ................ | B62D 5/0403 180/443 |
| 2013/0299271 A1* | 11/2013 | Endo | ...................... | B62D 5/046 180/446 |
| 2014/0009093 A1* | 1/2014 | Suzuki | ................ | H02P 21/0096 318/400.02 |
| 2014/0035493 A1* | 2/2014 | Ajima | ....................... | H02P 6/12 318/400.04 |
| 2014/0054103 A1* | 2/2014 | Kezobo | ................ | B62D 5/0487 180/446 |
| 2014/0077741 A1* | 3/2014 | Kumagai | ................ | H02P 23/00 318/490 |
| 2014/0091743 A1* | 4/2014 | Suzuki | .................. | H02P 29/027 318/400.22 |
| 2014/0097776 A1* | 4/2014 | Hayashi | ..................... | H02P 6/20 318/400.21 |
| 2014/0195117 A1* | 7/2014 | Kuwahara | .............. | B62D 5/049 701/41 |

FOREIGN PATENT DOCUMENTS

| | | |
|---|---|---|
| JP | 2011-078230 A | 4/2011 |
| JP | 2011-091962 A | 5/2011 |

OTHER PUBLICATIONS

Japanese Office Action dated Jun. 20, 2017 as issued in Japanese Application No. 2014-029411 and its partial English translation thereof.

Japanese Office Action dated Jan. 16, 2018 as issued in corresponding Japanese Application No. 2014-049411 and its English translation thereof.

* cited by examiner

FIG.6

| | STATE (ON/OFF CONTROL) OF EACH SWITCHING ELEMENT | | | | | | POWER SUPPLY RELAY |
|---|---|---|---|---|---|---|---|
| | U-PHASE High-SIDE | V-PHASE High-SIDE | W-PHASE High-SIDE | U-PHASE Low-SIDE | V-PHASE Low-SIDE | W-PHASE Low-SIDE | |
| U-PHASE High-SIDE SHORT | SHORT | OFF | OFF | OFF | OFF | OFF | ON OR OFF |
| V-PHASE High-SIDE SHORT | OFF | SHORT | OFF | OFF | OFF | OFF | ON OR OFF |
| W-PHASE High-SIDE SHORT | OFF | OFF | SHORT | OFF | OFF | OFF | ON OR OFF |
| U-PHASE Low-SIDE SHORT | OFF | OFF | OFF | SHORT | OFF | OFF | ON OR OFF |
| V-PHASE Low-SIDE SHORT | OFF | OFF | OFF | OFF | SHORT | OFF | ON OR OFF |
| W-PHASE Low-SIDE SHORT | OFF | OFF | OFF | OFF | OFF | SHORT | ON OR OFF |
| U-PHASE LINE SHORTED TO POWER SUPPLY (UPSTREAM OF POWER SUPPLY RELAY) | OFF | OFF | OFF | OFF | OFF | OFF | ON OR OFF |
| V-PHASE LINE SHORTED TO POWER SUPPLY (UPSTREAM OF POWER SUPPLY RELAY) | OFF | OFF | OFF | OFF | OFF | OFF | ON OR OFF |
| W-PHASE LINE SHORTED TO POWER SUPPLY (UPSTREAM OF POWER SUPPLY RELAY) | OFF | OFF | OFF | OFF | OFF | OFF | ON OR OFF |
| U-PHASE LINE GROUNDED | OFF | OFF | OFF | OFF | OFF | OFF | ON OR OFF |
| V-PHASE LINE GROUNDED | OFF | OFF | OFF | OFF | OFF | OFF | ON OR OFF |
| W-PHASE LINE GROUNDED | OFF | OFF | OFF | OFF | OFF | OFF | ON OR OFF |

FIG.7

| | STATE (ON/OFF CONTROL) OF EACH SWITCHING ELEMENT | | | | | | |
|---|---|---|---|---|---|---|---|
| | U-PHASE High-SIDE | V-PHASE High-SIDE | W-PHASE High-SIDE | U-PHASE Low-SIDE | V-PHASE Low-SIDE | W-PHASE Low-SIDE | POWER SUPPLY RELAY |
| U-PHASE High-SIDE SHORT | SHORT | OFF | OFF | ON | ON | ON | OFF |
| V-PHASE High-SIDE SHORT | OFF | SHORT | OFF | ON | ON | ON | OFF |
| W-PHASE High-SIDE SHORT | OFF | OFF | SHORT | ON | ON | ON | OFF |
| U-PHASE Low-SIDE SHORT | ON | ON | ON | SHORT | OFF | OFF | OFF |
| V-PHASE Low-SIDE SHORT | ON | ON | ON | OFF | SHORT | OFF | OFF |
| W-PHASE Low-SIDE SHORT | ON | ON | ON | OFF | OFF | SHORT | OFF |
| U-PHASE LINE SHORTED TO POWER SUPPLY (UPSTREAM OF POWER SUPPLY RELAY) | ON | ON | ON | OFF | OFF | OFF | ON OR OFF |
| V-PHASE LINE SHORTED TO POWER SUPPLY (UPSTREAM OF POWER SUPPLY RELAY) | ON | ON | ON | OFF | OFF | OFF | ON OR OFF |
| W-PHASE LINE SHORTED TO POWER SUPPLY (UPSTREAM OF POWER SUPPLY RELAY) | ON | ON | ON | OFF | OFF | OFF | ON OR OFF |
| U-PHASE LINE GROUNDED | ON | ON | ON | OFF | OFF | OFF | OFF |
| V-PHASE LINE GROUNDED | ON | ON | ON | OFF | OFF | OFF | OFF |
| W-PHASE LINE GROUNDED | ON | ON | ON | OFF | OFF | OFF | OFF |

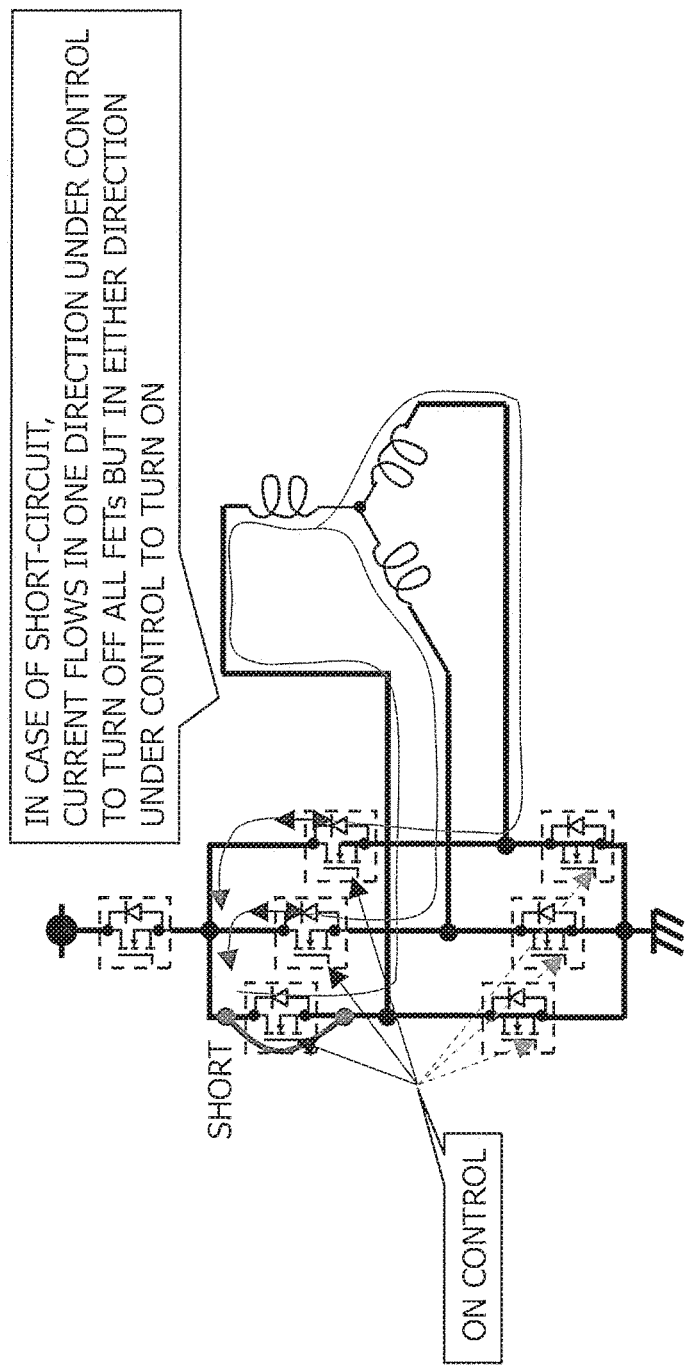

FIG.9

| | STATE (ON/OFF CONTROL) OF EACH SWITCHING ELEMENT | | | | | | |
|---|---|---|---|---|---|---|---|
| | U-PHASE High-SIDE | V-PHASE High-SIDE | W-PHASE High-SIDE | U-PHASE Low-SIDE | V-PHASE Low-SIDE | W-PHASE Low-SIDE | POWER SUPPLY RELAY |
| U-PHASE High-SIDE SHORT | SHORT | ON | ON | ON | ON | ON | OFF |
| V-PHASE High-SIDE SHORT | ON | SHORT | ON | ON | ON | ON | OFF |
| W-PHASE High-SIDE SHORT | ON | ON | SHORT | ON | ON | ON | OFF |
| U-PHASE Low-SIDE SHORT | ON | ON | ON | SHORT | ON | ON | OFF |
| V-PHASE Low-SIDE SHORT | ON | ON | ON | ON | SHORT | ON | OFF |
| W-PHASE Low-SIDE SHORT | ON | ON | ON | ON | ON | SHORT | OFF |
| U-PHASE LINE SHORTED TO POWER SUPPLY (UPSTREAM OF POWER SUPPLY RELAY) | ON | ON | ON | OFF | OFF | OFF | ON OR OFF |
| V-PHASE LINE SHORTED TO POWER SUPPLY (UPSTREAM OF POWER SUPPLY RELAY) | ON | ON | ON | OFF | OFF | OFF | ON OR OFF |
| W-PHASE LINE SHORTED TO POWER SUPPLY (UPSTREAM OF POWER SUPPLY RELAY) | ON | ON | ON | OFF | OFF | OFF | ON OR OFF |
| U-PHASE LINE GROUNDED | ON | ON | ON | ON | ON | ON | OFF |
| V-PHASE LINE GROUNDED | ON | ON | ON | ON | ON | ON | OFF |
| W-PHASE LINE GROUNDED | ON | ON | ON | ON | ON | ON | OFF |

FIG.10

| | STATE (ON/OFF CONTROL) OF EACH SWITCHING ELEMENT | | | | | | POWER SUPPLY RELAY |
|---|---|---|---|---|---|---|---|
| | U-PHASE High-SIDE | V-PHASE High-SIDE | W-PHASE High-SIDE | U-PHASE Low-SIDE | V-PHASE Low-SIDE | W-PHASE Low-SIDE | |
| U-PHASE High-SIDE SHORT | SHORT | ON | ON | OFF | OFF | OFF | ON OR OFF |
| V-PHASE High-SIDE SHORT | ON | SHORT | ON | OFF | OFF | OFF | ON OR OFF |
| W-PHASE High-SIDE SHORT | ON | ON | SHORT | OFF | OFF | OFF | ON OR OFF |
| U-PHASE Low-SIDE SHORT | OFF | OFF | OFF | SHORT | ON | ON | ON OR OFF |
| V-PHASE Low-SIDE SHORT | OFF | OFF | OFF | ON | SHORT | ON | ON OR OFF |
| W-PHASE Low-SIDE SHORT | OFF | OFF | OFF | ON | ON | SHORT | ON OR OFF |
| U-PHASE LINE SHORTED TO POWER SUPPLY (UPSTREAM OF POWER SUPPLY RELAY) | ON | ON | ON | OFF | OFF | OFF | ON OR OFF |
| V-PHASE LINE SHORTED TO POWER SUPPLY (UPSTREAM OF POWER SUPPLY RELAY) | ON | ON | ON | OFF | OFF | OFF | ON OR OFF |
| W-PHASE LINE SHORTED TO POWER SUPPLY (UPSTREAM OF POWER SUPPLY RELAY) | ON | ON | ON | OFF | OFF | OFF | ON OR OFF |
| U-PHASE LINE GROUNDED | OFF | OFF | OFF | ON | ON | ON | ON OR OFF |
| V-PHASE LINE GROUNDED | OFF | OFF | OFF | ON | ON | ON | ON OR OFF |
| W-PHASE LINE GROUNDED | OFF | OFF | OFF | ON | ON | ON | ON OR OFF |

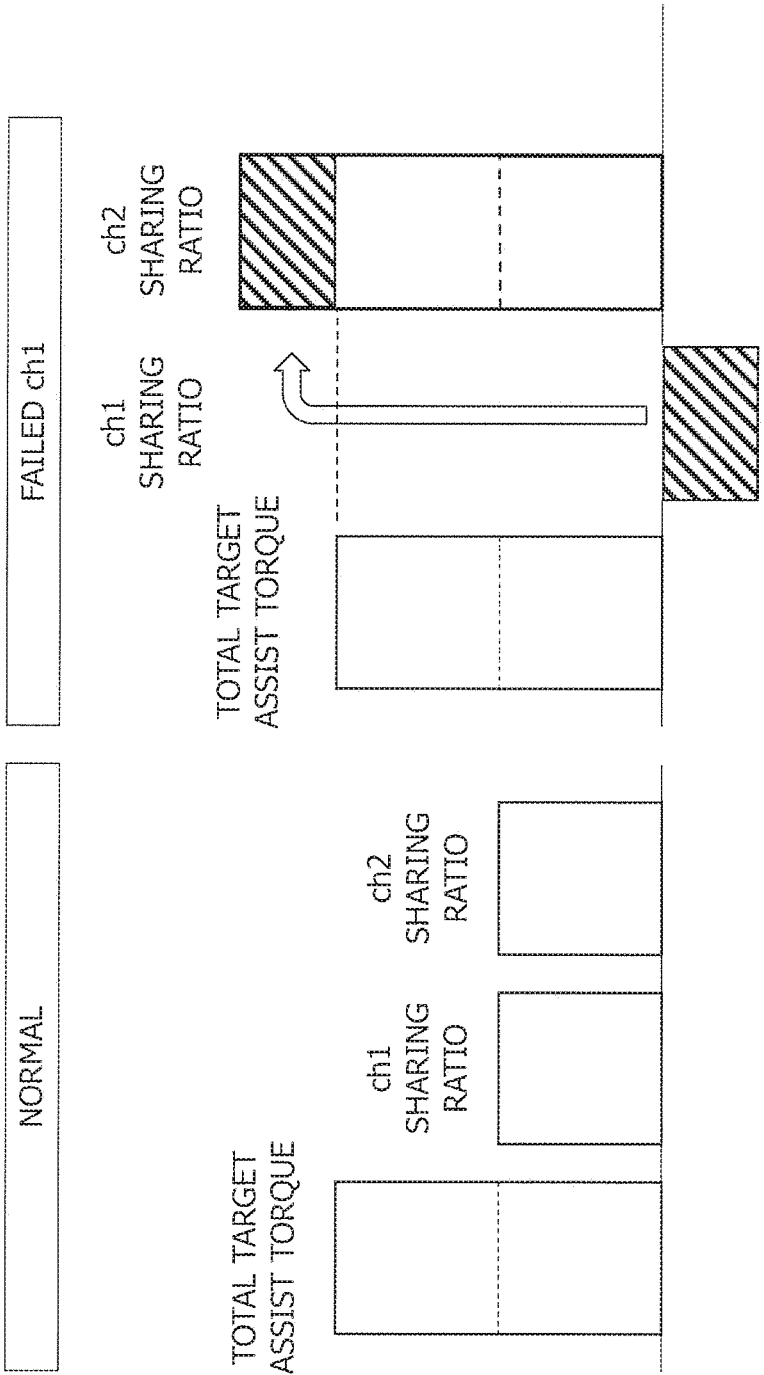

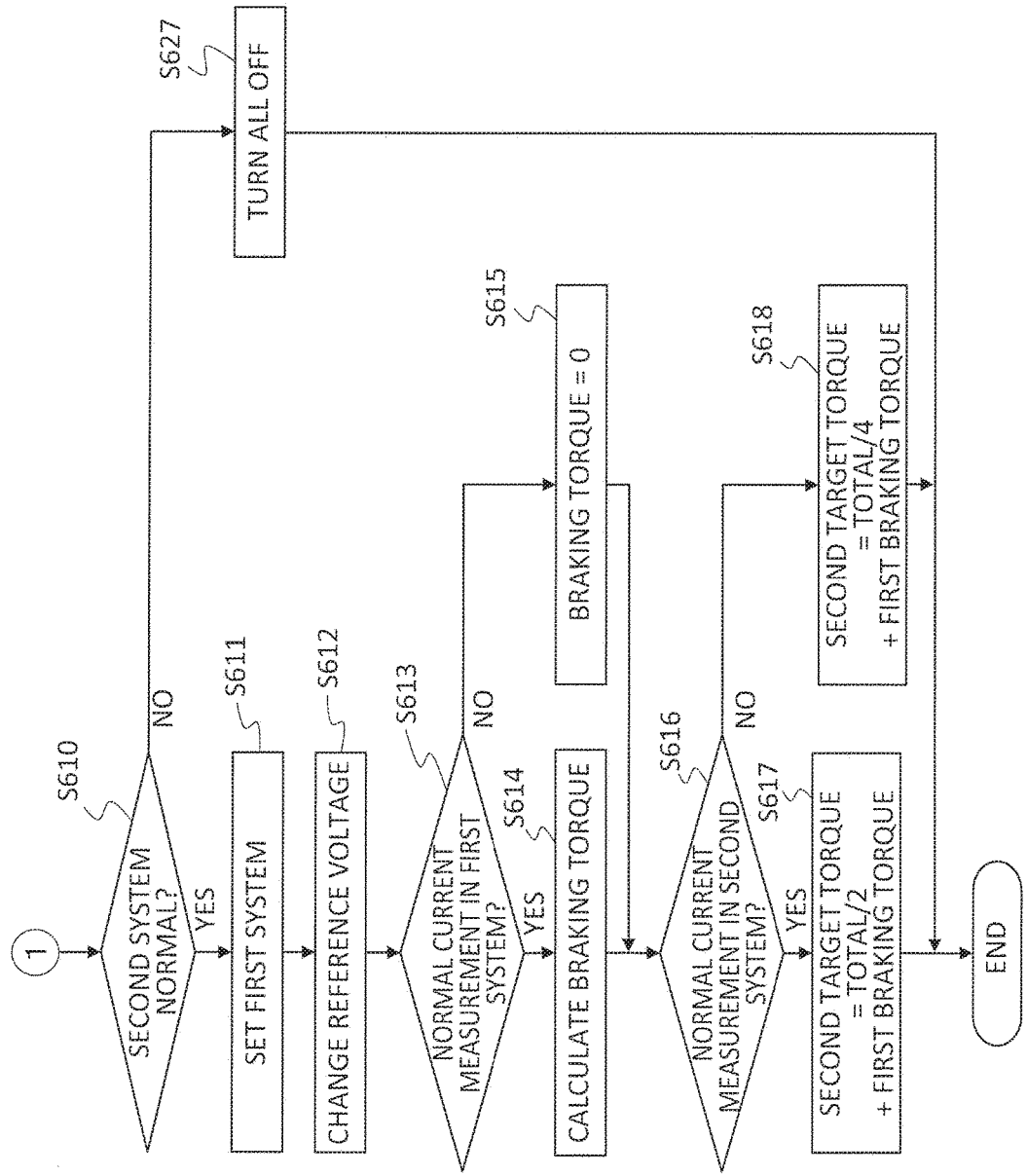

FIG.17

| | Current Detection Circuit | | | | | | | |
|---|---|---|---|---|---|---|---|---|
| Energization System | Normal current measurement | | Abnormal current measurement in ch1 (normal in ch2) | | Abnormal current measurement in ch2 (normal in ch1) | | Abnormal current measurement in ch1/ch2 | |
| Normal | 50% torque | 50% torque + torque compensating for braking torque | 25% torque | 25% torque + torque compensating for braking torque | 50% torque | 25% torque + torque compensating for braking torque | 25% torque | 25% torque |
| Failed energization system ch1 (ch2 normal) | Turn all off (braking torque generated) | 50% torque | Turn all off (braking torque generated/torque unknown) | 50% torque | Turn all off (braking torque generated) | 25% torque | Turn all off (braking torque generated/torque unknown) | 25% torque |
| Failed energization system ch2 (ch1 normal) | 50% torque + torque compensating for braking torque | Turn all off (braking torque generated) | 25% torque + torque compensating for braking torque | Turn all off (braking torque generated/torque unknown) | 50% torque | Turn all off (braking torque generated) | 25% torque | Turn all off (braking torque generated/torque unknown) |
| Failed energization system ch1/ch2 | Turn all off | | Turn all off | | Turn all off | | Turn all off | |

DRIVE CONTROLLER AND DRIVE CONTROL METHOD FOR ELECTRIC MOTOR

TECHNICAL FIELD

The present invention relates to a drive controller for an electric motor equipped with plural energization systems composed of inverters, and to a drive control method therefor.

BACKGROUND ART

Patent Document 1 discloses a controller for a multi-phase rotating machine, which is configured as follows. In case either the first inverter or the second inverter suffers from short-circuiting, all the MOSFETs in the failed system are turned OFF to stop the failed system from driving the motor, and the MOSFETs in the system that is normally operating are controlled so as to cancel out the braking torque generated in the failed system.

REFERENCE DOCUMENT LIST

Patent Document

Patent Document 1: JP 2011-078230 A

SUMMARY OF THE INVENTION

Problems to be Solved by the Invention

Here, the amount of current which may cause a braking torque (hereinafter referred to as "braking current") varies depending on the impedance at a short-circuited portion, etc. Thus, the braking torque might vary according to the type of fault.

On this account, unless the inverter in a normal system is controlled in consideration of the influence of the impedance at the failed portion, there may arise a problem that the cancellation of the braking torque cannot be controlled uniformly and the resultant motor torque does not match a target value.

The present invention has been accomplished in view of some of the above problems and accordingly it is an object of the present invention to improve the controllability for an electric motor at the time when a braking current occurs with abnormal energization.

Means for Solving the Problems

In order to achieve the object, the present invention provides a drive controller for an electric motor equipped with a plurality of energization systems composed of an inverter and coils corresponding to a plurality of phases, the drive controller comprising: a current detecting unit disposed in each of the energization systems and configured to detect currents between the coils and output points of the inverter or between the coils and a connection point between the coils; an inverter setting unit configured to set, when abnormal energization occurs in at least one of the energization systems, the inverter of the energization system involving the abnormal energization into a predetermined condition; and a torque detecting unit configured to detect a torque generated in the energization system involving the abnormal energization with the inverter being set into the predetermined condition, based on a current in the energization system involving the abnormal energization as detected by the current detecting unit.

Furthermore, the present invention provides a drive control method for an electric motor equipped with a plurality of energization systems composed of an inverter and coils corresponding to a plurality of phases, the method comprising the steps of: controlling, when at least one of the energization systems involves abnormal energization, the inverter of the energization system involving the abnormal energization into a predetermined condition; detecting currents between the coils and output points of the inverter of the energization system involving the abnormal energization or between the coils of the energization system involving the abnormal energization and a connection point between the coils, while the inverter is controlled into the predetermined condition; and detecting a torque generated in the energization system involving the abnormal energization based on the detected current.

Effects of the Invention

According to the present invention, it is possible to detect a torque (braking torque) reflecting impedances that vary depending on the fault type to thereby improve the controllability for the electric motor, i.e., the performance of controlling the electric motor in response to braking torques.

BRIEF DESCRIPTION OF THE DRAWINGS

FIG. 6 illustrates an example of ON/OFF control patterns for semiconductor switching elements in case of abnormal energization according to an embodiment of the present invention.

FIG. 7 illustrates an example of ON/OFF control patterns for semiconductor switching elements in case of abnormal energization according to an embodiment of the present invention.

FIG. 8 illustrates the current flow at the time when one of the high-potential side semiconductor switching elements suffers from short-circuiting and hereby all the semiconductor switching elements are controlled to OFF state according to an embodiment of the present invention.

FIG. 9 illustrates an example of ON/OFF control patterns for semiconductor switching elements in case of abnormal energization according to an embodiment of the present invention.

FIG. 10 illustrates an example of ON/OFF control patterns for semiconductor switching elements in case of abnormal energization according to an embodiment of the present invention.

FIG. 11 is an explanatory view illustrating an example of setting a target assist torque in each energization system in case of abnormal energization according to an embodiment of the present invention.

FIG. 16 is a flowchart illustrating the processing flow for individual types of abnormal energization and abnormal current detection according to an embodiment of the present invention.

FIG. 17 illustrates processing patterns for individual types of abnormal energization and abnormal current detection according to an embodiment of the present invention.

MODE FOR CARRYING OUT THE INVENTION

Figure 1:
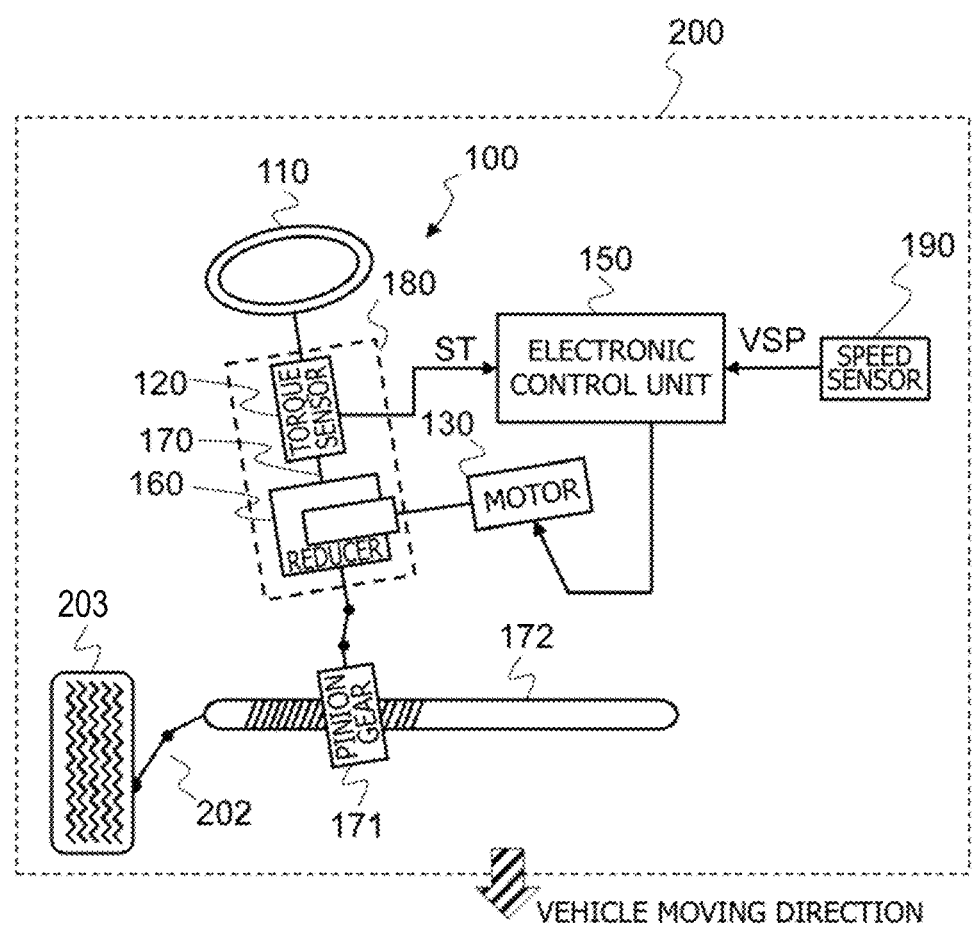
FIG. 1 is a schematic diagram of an electric power steering device that adopts a drive controller for an electric motor according to an embodiment of the present invention.

Hereinafter, an embodiment of the present invention will be described. FIG. 1 illustrates an example of a vehicle electric power steering device that adopts the drive controller and control method for an electric motor according to the present invention.

An electric power steering device 100 in FIG. 1, which is installed in a vehicle 200, generates a steering assist force with an electric motor 130.

Electric power steering device 100 is composed of a steering wheel 110, a steering torque sensor 120, electric motor 130, an electronic control unit 150, a reducer 160 that reduces a rotational speed of electric motor 130 and then transmits the reduced rotational speed to a steering shaft (pinion shaft) 170, and the like.

Steering torque sensor 120 and reducer 160 are disposed in a steering column 180 that accommodates steering shaft 170.

A pinion gear 171 is provided at the tip end of steering shaft 170. Along with the rotation of pinion gear 171, a rack gear 172 is horizontally moved to the left or right as viewed in the travel direction of vehicle 200. A steering mechanism 202 for a wheel 203 is provided at the opposite ends of rack gear 172. Along with the horizontal movement of rack gear 172, wheel 203 can change its direction.

Steering torque sensor 120 detects a steering torque of steering shaft 170 generated as a driver steers the vehicle, and then outputs a signal ST indicating the detected steering torque to electronic control unit 150.

Electronic control unit 150 includes a microcomputer (arithmetic processing unit), an inverter for driving electric motor 130, an inverter drive circuit, etc. and receives information about a state variable for determining a steering assist force such as steering torque signal ST and a vehicle speed signal VSP output from a vehicle speed sensor 190.

When receiving steering torque signal ST, vehicle speed signal VSP, or the like, electronic control unit 150 controls energization to electric motor 130 based on the driving condition of a vehicle indicated by these signals, thereby controlling the torque generated in electric motor 130, i.e., steering assist force. In this way, electronic control unit 150 serves as a drive controller for driving electric motor 130.

As for the inverter and the inverter drive circuit incorporated in electronic control unit 150, the inverter can be provided alone or together with the drive circuit independently outside electronic control unit 150.

Figure 2:
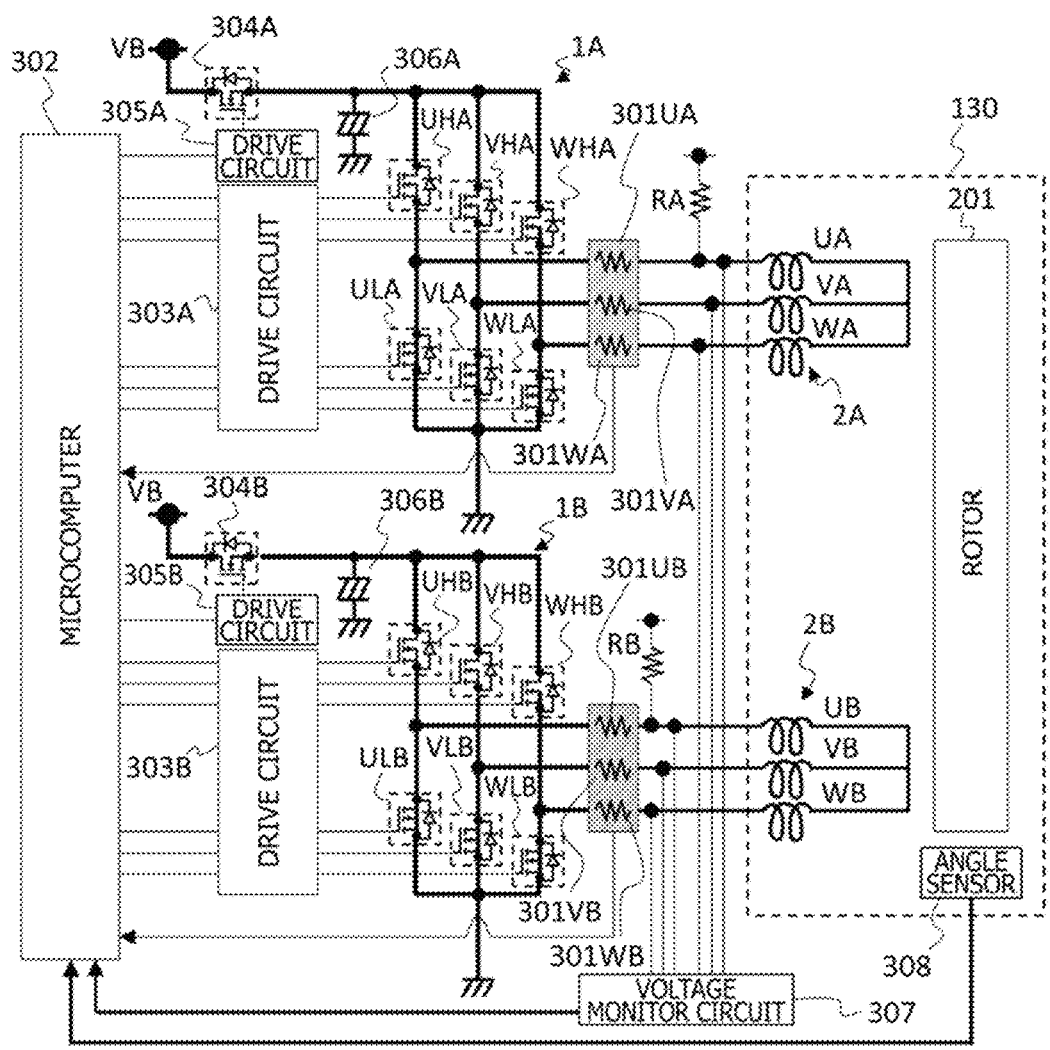
FIG. 2 is a circuit diagram of a drive controller according to an embodiment of the present invention.

FIG. 2 illustrates an example of the circuit configuration of electronic control unit 150 and electric motor 130.

Electric motor 130 of FIG. 2 is a three-phase synchronous electric motor composed of a first coil set 2A of star-connected three-phase coils UA, VA, and WA and a second coil set 2B of star-connected three-phase coils UB, VB, and WB. In first coil set 2A and second coil set 2B, a connection point among three-phase coils U, V, and W is a neutral point.

First coil set 2A and second coil set 2B are disposed in an unillustrated cylindrical stator and a permanent magnet rotator 201 is rotatably provided inside a space formed at the central portion of the stator. First coil set 2A and second coil set 2B share a magnetic circuit.

Moreover, first coil set 2A is directly connected to a first inverter 1A, and second coil set 2B is directly connected to a second inverter 1B. First inverter 1A supplies power to first coil set 2A, and second inverter 1B supplies power to second coil set 2B.

First inverter 1A is configured by a three-phase bridge circuit including three pairs of semiconductor switches, i.e., semiconductor switches UHA and ULA for driving a U-phase coil UA of first coil set 2A, semiconductor switches VHA and VLA for driving a V-phase coil VA thereof, and semiconductor switches WHA and WLA for driving a W-phase coil WA thereof.

Moreover, second inverter 1B is configured by a three-phase bridge circuit including three pairs of semiconductor switches, i.e., semiconductor switches UHB and ULB for driving a U-phase coil UB of second coil set 2B, semiconductor switches VHB and VLB for driving a V-phase coil VB thereof, and semiconductor switches WHB and WLB for driving a W-phase coil WB thereof.

In this embodiment, the semiconductor switches constituting first inverter 1A and second inverter 1B are N-channel MOSFETs.

In first inverter 1A and second inverter 1B, semiconductor switches UH and UL have series-connected drain and source between a power supply VB and the ground point, and a connection point between semiconductor switches UH and UL, i.e., an output point of the inverter is connected to a U-phase coil U.

Furthermore, in first inverter 1A and second inverter 1B, semiconductor switches VH and VL have series-connected drain and source between power supply VB and the ground point, and a connection point between semiconductor switches VH and VL, i.e., an output point of the inverter is connected to a V-phase coil V.

Moreover, in first inverter 1A and second inverter 1B, semiconductor switches WH and WL have series-connected drain and source between power supply VB and the ground point, and a connection point between semiconductor switches WH and WL, i.e., an output point of the inverter is connected to a W-phase coil W.

A first drive circuit 303A functions to drive the semiconductor switches constituting first inverter 1A, and includes three high-potential side drivers for respectively driving semiconductor switches VHA, UHA, and WHA as high-potential side switching elements in first inverter 1A, and three low-potential side drivers for respectively driving semiconductor switches VLA, ULA, and WLA as low-potential side switching elements in first inverter 1A.

Note that the high-potential side switching element can be referred to as "upstream drive element" or "upper arm". The low-potential side switching element can be referred to as "downstream drive element" or "lower arm".

Furthermore, a second drive circuit 303B functions to drive the semiconductor switches constituting second inverter 1B, and includes three high-potential side drivers for respectively driving semiconductor switches VHB, UHB, and WHB as high-potential side switching elements in second inverter 1B, and three low-potential side drivers for respectively driving semiconductor switches VLB, ULB, and WLB as low-potential side switching elements in second inverter 1B.

First drive circuit 303A and second drive circuit 303B drive the semiconductor switches constituting inverters 1A and 1B, respectively according to a PWM control signal as a command signal from microcomputer 302.

As described above, first inverter 1A and second inverter 1B respectively serve as the energization system composed of high-potential side switching elements and the one composed of low-potential side switching elements, the high and low-potential side switching elements being provided in correspondence with the three phases. Electronic control unit 150 of this embodiment includes two energization systems: the first energization system of first inverter 1A and the second energization system of second inverter 1B.

A power supply relay 304A is provided between power supply VB and first inverter 1A in order to interrupt the power supply to first inverter 1A, and a power supply relay 304B is provided between power supply VB and second inverter 1B in order to interrupt the power supply to second inverter 1B.

In this embodiment, power supply relays 304A and 304B are configured by semiconductor switches. The semiconductor switches constituting power supply relays 304A and 304B are driven by drive circuits 305A and 305B.

As power supply relays 304A and 304B, electromagnetic relays, each of which provides electrical switching by physically moving its contact point, may be alternatively used.

Drive circuits 305A and 305B of power supply relays 304A and 304B drive the semiconductor switches constituting power supply relays 304A and 304B according to a command signal from microcomputer 302. To be specific, microcomputer 302 can independently interrupt power supply to first inverter 1A and power supply to second inverter 1B.

Furthermore, in order to reduce fluctuations in power supply voltage to inverters 1A and 1B, capacitors 306A and 306B are provided. More specifically, capacitor 306A connects, to the ground point, the power supply line between power supply relay 304A and inverter 1A, whereas capacitor 306B connects, to the ground point, the power supply line between power supply relay 304B and inverter 1B.

Also, there are provided a voltage monitor circuit 307A for detecting coil-end voltage in coil set 2A, and a voltage monitor circuit 307B for detecting coil-end voltage in coil set 2B. Voltage monitor circuits 307A and 307B output, to microcomputer 302, signals indicating detected coil-end voltages in coil sets 2A and 2B. In addition, to keep the coil-end potential in coil set 2A fixed even when all the switching elements in inverter 1A are turned OFF, a pull-up resister RA for pulling up U-phase coil UA in coil set 2A is provided. To keep the coil-end potentials in coil set 2B fixed even when all the switching elements in inverter 1B are turned OFF, a pull-up resister RB for pulling up U-phase coil UB in coil set 2B is provided.

An angle sensor 308 detects the angle of rotor 201, and outputs a signal indicating the detected angle to microcomputer 302.

Moreover, 301UA, 301VA, 301WA, 301UB, 301VB, and 301WB are provided to detect drive current flowing in a corresponding one of three-phase coils U, V, and W, and disposed on the drive line connecting a corresponding pair of three-phase coils U, V, and W and connection points between low-potential side semiconductor switches UL, VL, and WL and high-potential side semiconductor switches UH, VH, and WH, more specifically, disposed between a corresponding pair of three-phase coils U, V, and W and output points of inverters 1A and 1B.

Figure 3:
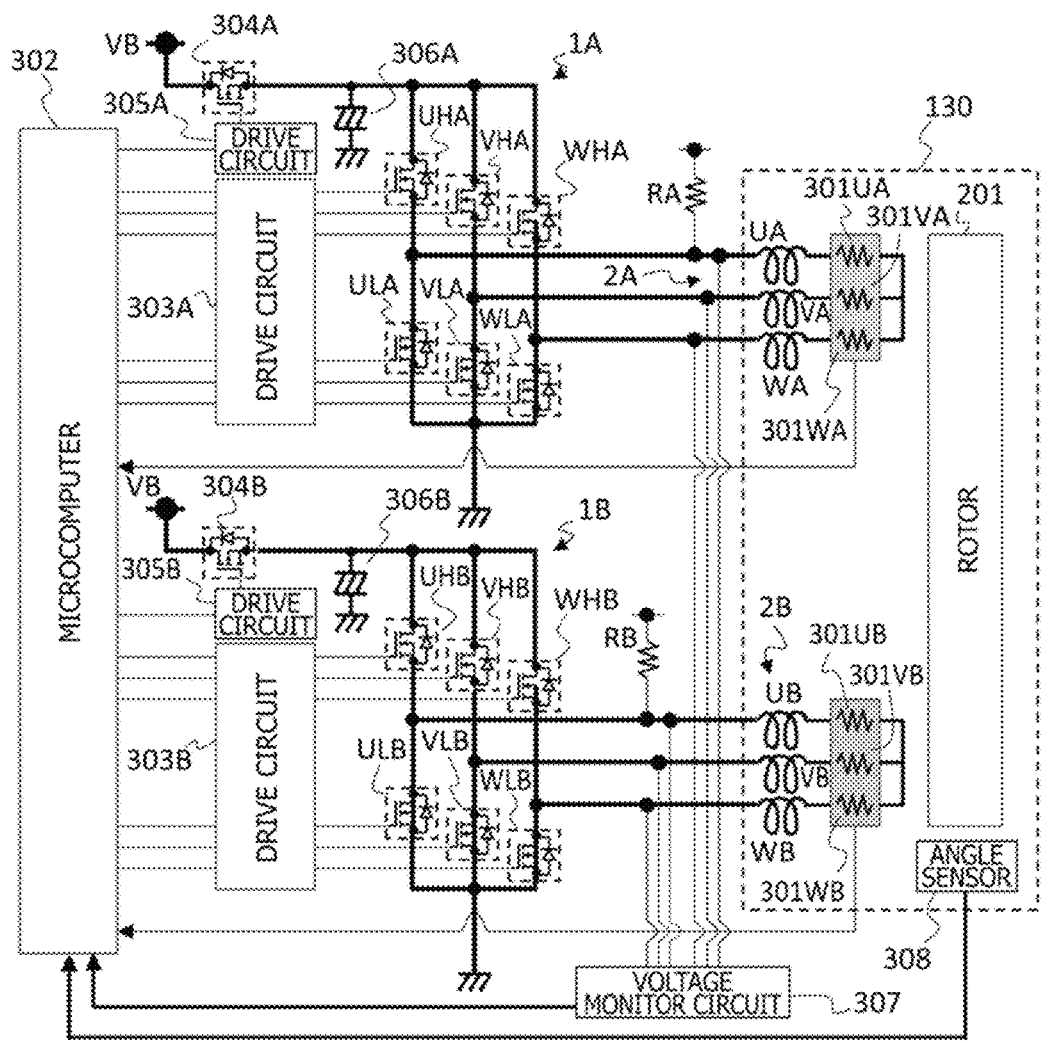
FIG. 3 is a circuit diagram of a drive controller according to an embodiment of the present invention.

Note that as illustrated in FIG. 3, current sensors 301UA, 301VA, 301WA, 301UB, 301VB, and 301WB may be individually provided between three-phase coils U, V, and W and the neutral point as the connection points among the coils.

In addition, current sensors 301UA, 301VA, 301WA, 301UB, 301VB, and 301WB can be also referred to as "current detecting resistors" or "current detecting devices".

Figure 4:
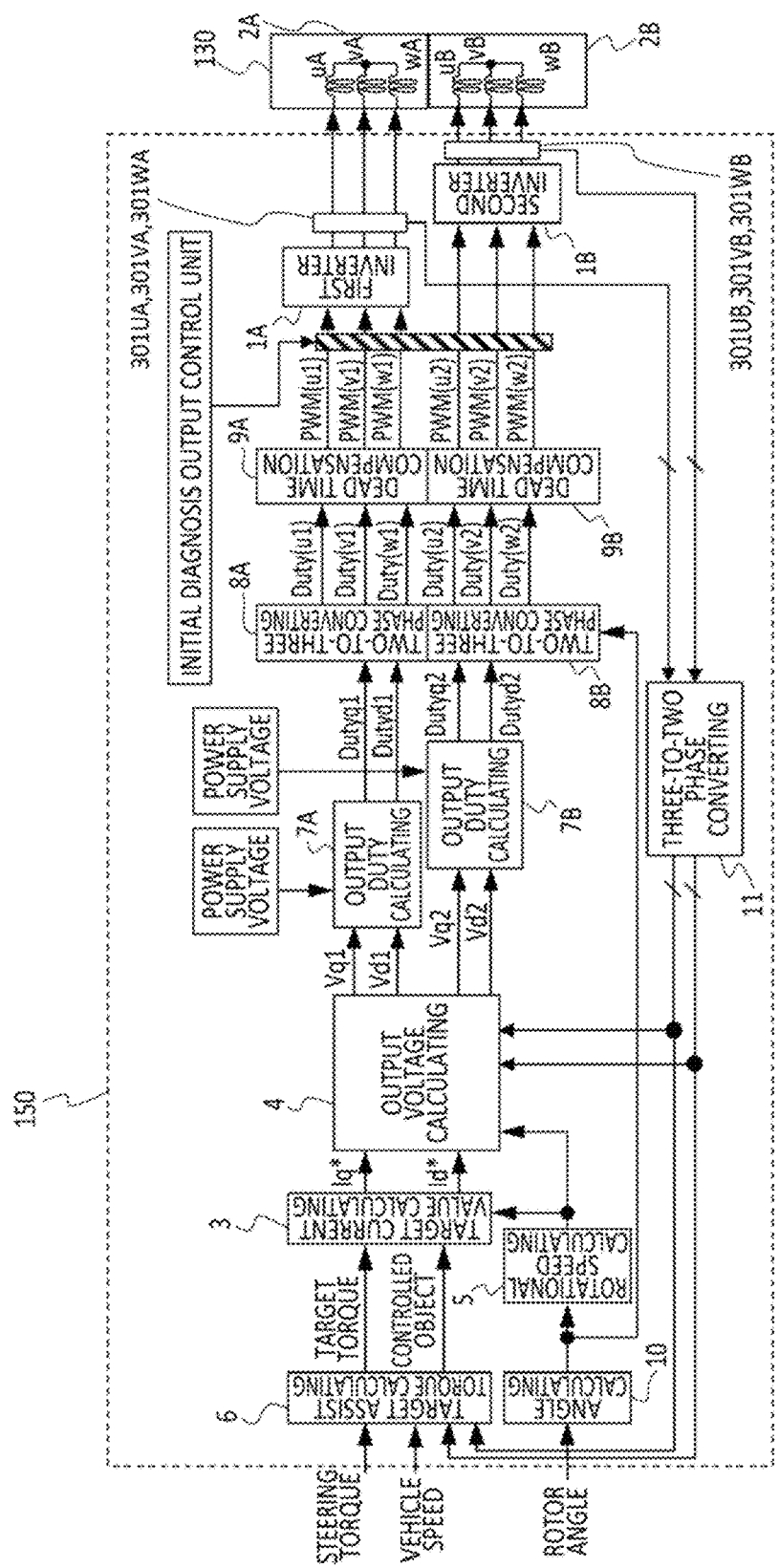
FIG. 4 is a functional block diagram of a drive controller according to an embodiment of the present invention.

FIG. 4 is a functional block diagram illustrating an example of the function of controlling inverters 1A and 1B, which is implemented by microcomputer 302.

A target assist torque calculating unit 6 calculates a target assist torque, i.e., a target value of an output torque of electric motor 130 based on steering conditions such as a steering torque and a vehicle speed.

An angle calculating unit 10 receives a signal from angle sensor 308 and then calculates the angle of rotor 201 of electric motor 130.

A motor rotational speed calculating unit 5 calculates a rotational speed (rpm) of electric motor 130 based on information about the calculated angle of rotor 201 from angle calculating unit 10 and then outputs a signal indicating the calculated motor rotational speed to a target current value calculating unit 3 and an output voltage calculating unit 4.

Target current value calculating unit 3 receives data about the target assist torque and data about the rotational speed of electric motor 130, and then calculates a d-axis current command value $I_d^*$ and a q-axis current command value $I_q^*$ of electric motor 130 based on the input data, thereby outputting the calculated values.

Output voltage calculating unit 4 receives d-axis current command value $I_d^*$ and q-axis current command value $I_q^*$ output from target current value calculating unit 3, and a d-axis actual current value $I_d$ and a q-axis actual current value $I_q$ at each energization system, which are calculated by a three-to-two phase converting unit 11 and additionally receives data about the rotational speed of electric motor 130.

Output voltage calculating unit 4 calculates a d-axis voltage command value $V_d1$ and a q-axis voltage command value $V_q1$ of first inverter 1A and a d-axis voltage command value $V_d2$ and a q-axis voltage command value $V_q2$ of second inverter 1B and then outputs the calculated values.

Three-to-two phase converting unit 11 calculates a d-axis actual current value $I_d1$ and a q-axis actual current value $I_q1$ of the first energization system based on output signals from current sensors 301UA, 301VA, and 301WA, i.e., detected values of actual currents flowing through coils of three phases in first coil set 2A.

In addition, three-to-two phase converting unit 11 calculates a d-axis actual current value $I_d2$ and a q-axis actual current value $I_q2$ of the second energization system based on output signals from current sensors 301UB, 301VB, and 301WB, i.e., detected values of actual currents flowing through coils of three phases in second coil set 2B.

Three-to-two phase converting unit 11 outputs data about d-axis actual current value $I_d1$ and q-axis actual current value $I_q1$ of the first energization system and data about d-axis actual current value $I_d2$ and q-axis actual current value $I_q2$ of the second energization system to output voltage calculating unit 4 and target assist torque calculating unit 6, respectively.

Then, d-axis voltage command value $V_d1$ and q-axis voltage command value $V_q1$ output from output voltage calculating unit 4 are input to a first output duty calculating unit 7A.

First output duty calculating unit 7A calculates a d-axis duty Dutyd1 and a q-axis duty Dutyq1 of first inverter 1A in PWM (Pulse Width Modulation) control, based on d-axis voltage command value $V_d1$, q-axis voltage command value $V_q1$, and the power supply voltage of first inverter 1A, and then outputs the calculated values.

Furthermore, d-axis voltage command value $V_d2$ and q-axis voltage command value $V_q2$ output form output voltage calculating unit 4 are input to a second output duty calculating unit 7B.

Second output duty calculating unit 7B calculates a d-axis duty Dutyd2 and a q-axis duty Dutyq2 of second inverter 1B in PWM control based on d-axis voltage command value $V_d2$, q-axis voltage command value $V_q2$, and the power supply voltage of second inverter 1B.

A first two-to-three phase converting unit 8A receives d-axis duty Dutyd1 and q-axis duty Dutyq1 output from first output duty calculating unit 7A and also information about the rotor angle in electric motor 130. First two-to-three phase converting unit 8A calculates, based on these, duty command values DutyU1, DutyV1, and DutyW1 of three phases in first coil set 2A, and then outputs the calculated values.

In addition, a second two-to-three phase converting unit 8B receives d-axis duty Dutyd2 and q-axis duty Dutyq2 output from second output duty calculating unit 7B and also information about the rotor angle in electric motor 130. Second two-to-three phase converting unit 8B calculates, based on these, duty command values DutyU2, DutyV2, and DutyW2 of three phases in second coil set 2B, and then outputs the calculated values.

A first dead time compensation unit 9A receives duty command values DutyU1, DutyV1, and DutyW1 output from first two-to-three phase converting unit 8A. First dead time compensation unit 9A compensates for the dead time thereof to obtain, by calculation, duty command values DutyU1, DutyV1, and DutyW1 and then outputs the calculated values to inverter 1A.

In addition, a second dead time compensation unit 9B receives duty command values DutyU2, DutyV2, and DutyW2 output from second two-to-three phase converting unit 8B. Second dead time compensation unit 9B compensates for the dead time thereof to obtain, by calculation, duty command values DutyU2, DutyV2, and DutyW2, and outputs the calculated values to inverter 1B.

The dead time compensation means the processing for suppressing a voltage drop etc. that will occur with a dead time voltage at the time of PWM control for retarding, by the dead time, the rising edge of a PWM signal indicating a result of comparing a triangular wave with a command value to thereby generate a gate signal of the switching element so as not to cause short-circuiting between upper and lower arms of inverters 1A and 1B.

Furthermore, target assist torque calculating unit 6 functions to stop PWM control on a failed one (with abnormal energization) of the two energization systems, or calculate a braking torque generated in the failed energization system, thereby changing a target assist torque for the normal energization system (without abnormal energization) according to the braking torque.

The abnormal energization in the energization system is such a fault that a potential of the coil equals the power supply potential or the ground potential. More specifically, it refers to a fault such as a short-circuit in any of high-potential side switching elements or low-potential side switching elements constituting inverters 1A and 1B, a short-to-ground of any of the three-phase drive lines, or a short-to-supply of any of the three-phase drive lines.

Here, the short-to-supply means a short-circuit between the high-potential side and the drive line, and the short-to-ground means a short-circuit between the low-potential side and the drive line. As for the abnormal energization like the short-circuit in any high-potential side switching element and the short-to-supply of any drive line, a potential of the coil equals a power supply potential. As for the abnormal energization like the short-circuit in any low-potential side switching element and the short-to-ground of any drive line, a potential of the coil equals the ground potential.

Microcomputer 302 makes a diagnosis on each energization system as to abnormal energization based on, for example, the control status of the respective switching elements constituting the inverter, a phase current and/or a coil-end voltage, which is detected by a corresponding sensor. For example, microcomputer 302 makes a diagnosis as described below as to whether the abnormal energization occurs.

Microcomputer 302 makes a diagnosis as to whether short-circuiting occurs in high-potential side switching elements or low-potential side switching elements, based on coil-end voltages under the condition that power supply relays 304A and 304B are turned ON and all the switching elements constituting inverters 1A and 1B are turned OFF. In addition, microcomputer 302 makes a diagnosis as to the short-to-supply or the short-to-ground based on the coil-end voltages under the condition that power supply relays 304A and 304B are turned OFF.

Also, microcomputer 302 can make a diagnosis as to whether short-circuiting occurs in the switching element based on a phase current when the elements are under the PWM control.

Then, microcomputer 302 executes control to hold the ON or OFF state of the switching elements constituting the inverter in the energization system that has been diagnosed as suffering from abnormal energization, according to a predetermined pattern, and then stops the PWM control on the inverter in the system involving the abnormal energization.

On the other hand, microcomputer 302 continues the PWM control on an inverter in a normal system not involving abnormal energization and in addition, executes PWM control on switching elements of the inverter in the normal system so as to mitigate an adverse effect of motor driving with the energization system involving the abnormal energization. More specifically, microcomputer 302 causes target assist torque calculating unit 6 to change the calculation of a target assist torque so as to cancel out the braking torque generated in the coil of the energization system involving the abnormal energization.

Then, target assist torque calculating unit 6 calculates a target assist torque according to the fault diagnosis, and outputs a signal indicating the calculated target assist torque to target current value calculating unit 3 and also, determines which energization system should be subject to PWM control according to a target assist torque, based on the fault diagnosis, thereby outputting a signal indicating the energization system to be controlled, toward target current value calculating unit 3.

Figure 5:
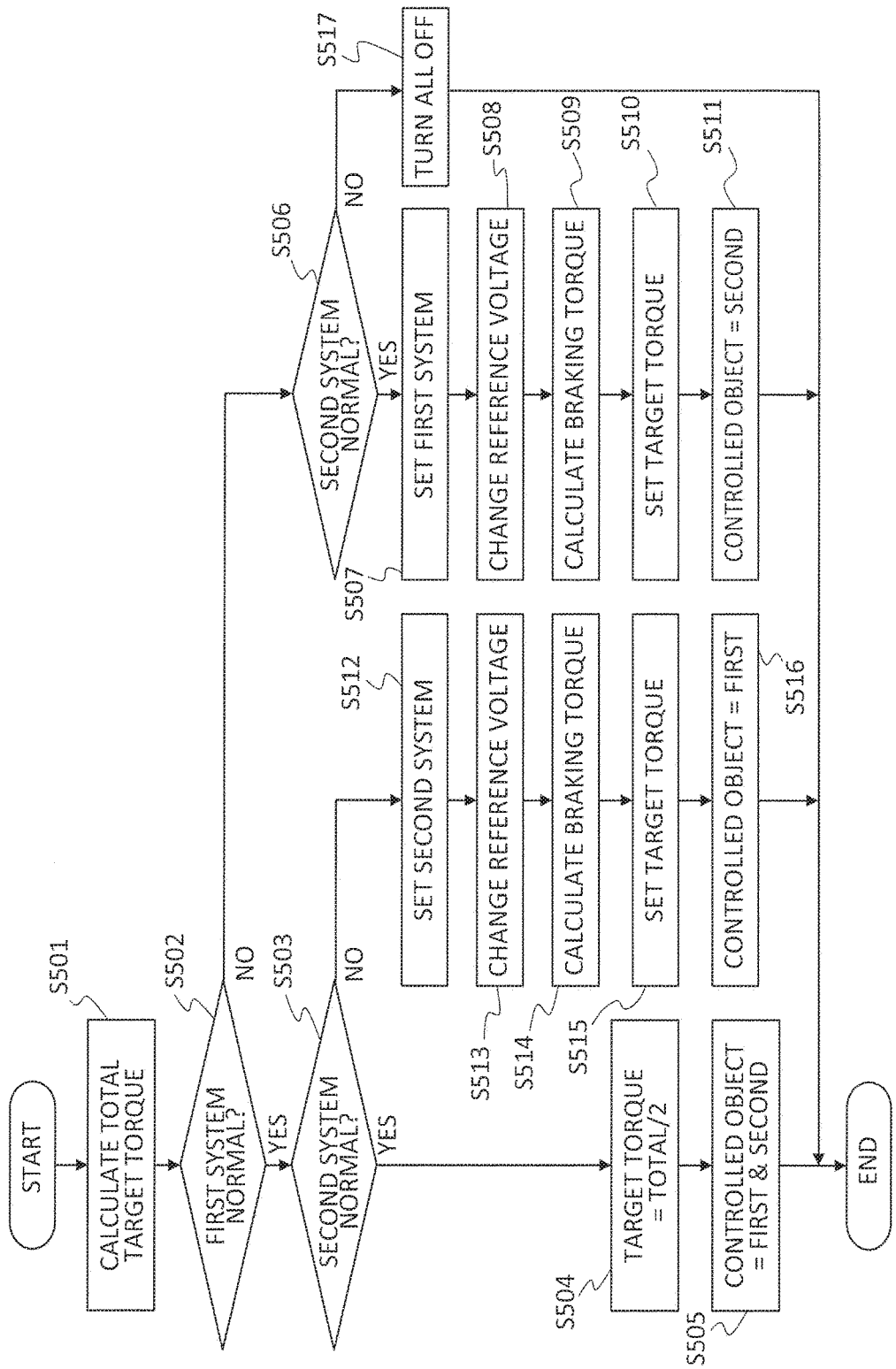
FIG. 5 is a flowchart illustrating the processing flow in case of abnormal energization according to an embodiment of the present invention.

Referring to a flowchart of FIG. 5, a detailed description is given of the flow of inverter control executed by electronic control unit 150 based on diagnoses on each energization system as to abnormal energization.

A routine illustrated in the flowchart of FIG. 5 is interruptedly performed at predetermined time intervals by electronic control unit 150.

First, in step S501, electronic control unit 150 calculates the total target assist torque based on the steering torque detected by steering torque sensor 120 or information about the vehicle speed.

The total target assist torque implies the total sum of a target value of a motor torque generated by controlling energization to first coil set 2A with the first energization system, and a target value of a motor torque generated by controlling energization to second coil set 2B with the second energization system.

Note that the first energization system can be referred to as a "first channel ch1" and the second energization system can be referred to as a "second channel ch2".

In subsequent step S502, electronic control unit 150 determines whether the first energization system has been diagnosed as being free from abnormal energization, i.e., as being normal without a short-circuit in any switching element, a short-to-ground of the drive line, and a short-to-supply thereof.

If determining that the first energization system is normal, electronic control unit 150 proceeds to step S503 to determine whether the second energization system has been diagnosed as being free from a fault, i.e., as being normal without a short-circuit in any switching element, a short-to-ground of the drive line, and a short-to-supply of the drive line.

Then, if the first energization system and the second energization system are both normal, electronic control unit 150 proceeds to step S504 to set a half of the total target assist torque as a first target assist torque for the first energization system and likewise, sets a half of the total target assist torque as a second target assist torque for the second energization system.

In other words, a target assist torque is set for each energization system such that the first energization system controls the energization to first coil set 2A, thereby generating an assist torque corresponding to a half of the total sum, while the second energization system controls the energization to second coil set 2B, thereby generating an assist torque corresponding to a half of the total target assist torque.

Next, electronic control unit 150 proceeds to step S505 to set the first energization system and the second energization system as a control target so that semiconductor switching elements constituting inverters 1A and 1B of the first energization system and the second energization system are turned ON/OFF under the PWM control based on a target assist torque of each energization system.

As a result, electronic control unit 150 executes PWM control on first inverter 1A based on the first target assist torque and also executes PWM control on second inverter 1B based on the second target assist torque.

Here, the following equations are established: "first target assist torque=total sum/2" and "second target assist torque=total sum/2".

On the other hand, if determining that the first energization system suffers from abnormal energization in step S502, electronic control unit 150 proceeds to step S506.

In step S506, electronic control unit 150 determines whether the second energization system is normal, and if the first energization system suffers from abnormal energization and the second energization system is normal, proceeds to step S507.

In step S507, electronic control unit 150 executes ON/OFF control on switching elements constituting first inverter 1A of the first energization system suffering from the abnormal energization, according to a pattern used for the abnormal energization, thereby controlling the switching elements of first inverter 1A into a predetermined condition to stop the PWM control on first inverter 1A, i.e., switching operation of first inverter 1A.

Note that the ON state of the switching element implies that a duty ratio is 100%, and the OFF state of the switching element implies that the duty ratio is 0%.

FIG. 6 illustrates an example of a control pattern for the switching element in step S507.

Note that the following control patterns can apply to both of first inverter 1A and second inverter 1B. As described below, if the first energization system is normally operating while the second energization system suffers from any fault, the control patterns can be used for ON/OFF control on the switching elements of second inverter 1B.

As illustrated in FIG. 6, in this embodiment, abnormal energization in the energization system is classified, by way of example, into four types: a short-circuit of any high-potential side switching element of the inverter; a short-circuit of any low-potential side switching element of the inverter; a short-to-supply of any phase drive line; and a short-to-ground of any phase drive line. In the illustrated example of the control pattern illustrated in FIG. 6, electronic control unit 150 executes control to turn OFF all the switching elements constituting the inverter of the energization system suffering from abnormal energization regardless of the fault type.

Furthermore, according to the control pattern illustrated in FIG. 6, electronic control unit 150 can execute control to turn either ON or OFF power supply relay 304A. That is, in FIG. 6, "ON or OFF" in the field of power supply relay indicates that electronic control unit 150 can execute control to turn either ON or OFF power supply relay 304A.

As illustrated in FIG. 6, in the case of adopting a control pattern for turning OFF all switching elements constituting the inverter of the energization system that suffers from abnormal energization, even though there occurs one of the short-circuit of the high-potential side switching element of the inverter, the short-circuit of the low-potential side switching element of the inverter, the short-to-supply of the phase drive line, and the short-to-ground of the phase drive line, it is possible to restrict flowing of power supply current to the ground point.

Accordingly, electronic control unit 150 can execute control to uniformly turn ON or OFF power supply relay 304A (or power supply relay 304B) regardless of the fault type in the control pattern illustrated in FIG. 6.

FIG. 7 illustrates another example of the control pattern.

According to the control pattern of FIG. 7, electronic control unit 150 executes control to turn ON either one of the high-potential side switching element and the low-potential side switching element constituting the inverter of the energization system suffering from abnormal energization while turning OFF the other. In this way, according to the fault type, the high-potential side switching elements and the low-potential side switching elements are switched to turn ON.

According to the control pattern illustrated in FIG. 7, if any of the high-potential side switching elements of the inverter suffers from short-circuiting, electronic control unit 150 selects a control pattern to turn OFF all the high-potential side switching elements, while turning ON all the low-potential side switching elements.

Furthermore, according to the control pattern illustrated in FIG. 7, if any of the low-potential side switching elements in the inverter suffers from short-circuiting, more specifically, either in case of a short-to-supply of any phase drive line or in case of a short-to-ground of any phase drive line, electronic control unit 150 selects a control pattern to execute control to turn ON all the high-potential side switching elements while turning OFF all the low-potential side switching elements.

Regarding power supply relay 304A that interrupts power supply to first inverter 1A of the first energization system suffering from any fault, if the fault is any one of a short-circuit of the high-potential side switching element, a short-circuit of the low-potential side switching element of the inverter, and a short-to-ground of the phase drive line, power supply relay 304A is turned OFF under the control of electronic control unit 150. In case of a short-to-supply of the phase drive line, however, electronic control unit 150 can execute control to turn either ON or OFF power supply relay 304A.

Accordingly, electronic control unit 150 can not only turn OFF power supply relay 304A regardless of the type of fault that occurs in the first energization system but also perform the following control: in case of a short-circuit of any high-potential side switching element, a short-circuit of any low-potential side switching element of the inverter, or a short-to-ground of any phase drive line, electronic control unit 150 turns OFF power supply relay 304A, and in case of a short-to-supply of any phase drive line, electronic control unit 150 keeps power supply relay 304A ON.

In case short-circuiting occurs in semiconductor switch UH out of the high-potential side switching elements of the inverter, if electronic control unit 150 turns OFF all the switching elements according to the control pattern illustrated in FIG. 6, a braking current flows into each phase due to an inductive voltage that is generated along with the rotation of electric motor 130 as illustrated in FIG. 8.

Note that the braking current means a current that induces a torque to weaken the driving force.

In this case, since semiconductor switches VH and WH are OFF, the current flow in semiconductor switches VH and WH is limited to a channel direction of a parasitic diode. In addition, low-potential side switching elements UL, VL, and WL are OFF, and parasitic diodes of low-potential side switching elements UL, VL, and WL block the current flow to the ground point, whereby no current flows through low-potential side switching elements UL, VL, and WL into the ground point.

Accordingly, the braking current flows from the U phase into the W phase and the V phase. After passing through the W phase, the current flows into semiconductor switch UH through the parasitic diode of semiconductor switch WH.

After passing through the V phase, the current flows into semiconductor switch UH through the parasitic diode of semiconductor switch VH. The braking current flows into the U, V, and W phases only in one direction and thus shows a half-wave form.

In contrast, according to the control pattern illustrated in FIG. 7, if short-circuiting occurs in any high-potential side switching element of the inverter, electronic control unit 150 executes control to turn OFF all the high-potential side switching elements while turning ON all the low-potential side switching elements. By this control, the low-potential side switching elements in ON state enable bidirectional current flow, with the result that the braking current is continuously generated.

Moreover, the power supply to the inverter is interrupted by turning OFF the power supply relay. Thus, the power supply line is by no means short-circuited to the ground point through the short-circuited high-potential side switching element and the low-potential side switching element controlled to turn ON.

Furthermore, in case short-circuiting occurs in any low-potential side switching element, if electronic control unit 150 executes control according to the control pattern illustrated in FIG. 6 to turn OFF all the high-potential side switching elements and the low-potential side switching elements, a braking current flows through a parasitic diode of a normal element not suffering from the short-circuiting out of the low-potential side switching elements, and then flows into the short-circuited low-potential side switching element. As a result, the braking current flows in the U, V, and W phases only in one direction and thus shows a half-wave form.

In contrast, when short-circuiting occurs in any low-potential side switching element of the inverter, if electronic control unit 150 executes control according to the control pattern illustrated in FIG. 7 to turn OFF all the low-potential side switching elements while turning ON all the high-potential side switching elements, the high-potential side switching elements in ON state enable bidirectional current flow and thus, the braking current is continuously generated.

Moreover, the power supply to the inverter is interrupted by turning OFF the power supply relay. As a result, the power supply line is by no means short-circuited to the ground point through the short-circuited low-potential side switching element and the high-potential side switching element controlled into ON state.

Moreover, when any drive line of each phase is short-circuited to the power supply, if electronic control unit 150 executes control according to the control pattern illustrated in FIG. 7 to turn OFF all the low-potential side switching elements while turning ON all the high-potential side switching elements, the high-potential side switching elements in ON state enable bidirectional current flow and the braking current is continuously generated. In addition, the power supply line is by no means short-circuited to the ground point through the low-potential side switching element.

When any drive line of each phase is short-circuited to the power supply, even if electronic control unit 150 executes control to turn OFF the power supply relay, the power is supplied to the phase drive line and hence, electronic control unit 150 can keep the power supply relay ON and also can uniformly turn OFF the power supply relay regardless of the type of fault in the first energization system.

Furthermore, when any drive line of each phase is grounded, if electronic control unit 150 executes control according to the control pattern illustrated in FIG. 7 to turn OFF all the low-potential side switching elements while turning ON all the high-potential side switching elements, the high-potential side switching elements in ON state enable bidirectional current flow. As a result, the braking current is continuously generated and in addition, the power supply to the inverter is interrupted by turning OFF the power supply relay. Thus, no power supply current flows into the ground point through the grounded portion.

As described above, electronic control unit 150 executes, according to the control pattern illustrated in FIG. 7, ON/OFF control on the switching elements of the inverter in the energization system suffering from abnormal energization so as to control the high-potential side switching element or the low-potential side switching element of the energization system suffering from abnormal energization to decrease phase-to-phase impedance. With this configuration, a continuous braking current, not half-wave, can be generated in the energization system that suffers from abnormal energization.

Then, if the braking current is continuously generated, at the time of executing compensation control to correct an output from the inverter in the normal energization system so as to cancel out the braking torque, the accuracy of detecting the braking current flowing in each phase is enhanced compared to the half-wave braking current. As a result, the accuracy of compensation control increases.

Moreover, according to the control pattern illustrated in FIG. 7, a continuous braking current is generated, making it easier to execute the compensation control for the target assist torque based on the braking current than the half-wave braking current. A control program can be hereby simplified. Hence, a development cost for the control program can be saved and the capacity of the control program can be reduced, leading to reduction in product cost.

Note that according to the control pattern illustrated in FIG. 7, the switching element of the short-circuited inverter is not controlled to turn ON. As in the control pattern illustrated in FIG. 9, all the switching elements of not only the short-circuited inverter as well as the normal inverter can be controlled to turn ON.

Furthermore, in case any phase drive line is grounded, the power supply relay is controlled to turn OFF, hereby preventing a power supply current from flowing into the ground point through the grounded portion. Thus, electronic control unit 150 can execute control according to the control pattern of FIG. 9 to turn ON the high-potential side switching element and also turn ON the low-potential side switching element.

Note that in the control patterns of FIGS. 7 and 9, the same ON/OFF control is executed on the switching element and the power supply relay in case of a short-to-supply of any phase drive line.

Also even in the case of adopting the control pattern of FIG. 9, similar to the case of executing ON/OFF control on the switching elements according to the control pattern of FIG. 7, a continuous braking current is generated, and similar advantageous functions and effects are achieved.

As in the control pattern of FIG. 10, in case short-circuiting occurs in any low-potential side switching element and in case short-circuiting occurs in any high-potential side switching element, electronic control unit 150 executes control to turn ON the switching elements in the short-circuited system and also turn OFF the switching elements in the normal system.

If electronic control unit 150 executes control to turn OFF the switching elements on the normal side, the switching element controlled into OFF state can prevent a power supply current from flowing into the ground point. Regardless of whether the power supply relay is turned ON or OFF, similar advantageous functions and effects can be obtained.

Moreover, as in the control pattern of FIG. 10, if any phase drive line is grounded, electronic control unit 150 can execute control to turn OFF the high-potential side switching element and turn ON the low-potential side switching element. In this case, the high-potential side switching element controlled into OFF state can prevent a power supply current from flowing into the ground point. Thus, regardless of whether the power supply relay is turned ON or OFF, similar advantageous functions and effects can be obtained.

In other words, the control pattern of FIG. 10 is applicable to a motor drive circuit not equipped with the power supply relay that interrupts power supply to the individual inverters.

Here, in the control patterns of FIGS. 7, 9, and 10, the same ON/OFF control is executed on the switching element and the power supply relay in case of the short-to-supply of any phase drive line. Even according to the control pattern of FIG. 10, electronic control unit 150 can execute control to turn either ON or OFF the power supply relay in case of the short-to-supply.

More specifically, according to the control pattern of FIG. 10 as well as the control pattern of FIG. 7 or 9, a continuous braking current can be generated. In addition, there achieve advantageous function and effect that a braking current less fluctuates according to the fault type and also there is no necessity to execute fault control on the power supply relay regardless of the fault type.

Note that the control patterns of FIGS. 6, 7, 9, and 10 can be appropriately combined to execute control for all types of fault, for example, so as to turn ON the high-potential side switching element and turn OFF the low-potential side switching element or execute control for all types of fault but a short-to-supply so as to turn ON the low-potential side switching element and turn OFF the high-potential side switching element.

Furthermore, according to the control patterns of FIGS. 9 and 10, electronic control unit 150 executes control to turn ON all of the high-potential or low-potential side switching elements including the short-circuited switching element. However, the electronic control unit can execute control to turn ON all the switching elements but the short-circuited one, while turning OFF the short-circuited switching element.

In step S507 of the flowchart illustrated in FIG. 5, according to the control pattern of FIG. 6, 7, 9, or 10, electronic control unit 150 executes control so that the switching elements constituting the inverter in the energization system suffering from the abnormal energization comes into a predetermined condition, and then proceeds to step S508.

In step S508, electronic control unit 150 switches a reference voltage for detecting a current based on outputs from current sensors 301UA, 301VA, and 301WA configured to detect a phase current in the first energization system involving the abnormal energization to a value of when PWM control on first inverter 1A (switching operation) is stopped unlike when first inverter 1A is under PWM control.

Current sensors 301 convert into a current value a voltage obtained by amplifying a potential difference between opposite ends of a shunt resistor with an operational amplifier. Electronic control unit 150 previously determines, as a reference voltage, a voltage corresponding to a current of 0 A and then calculates a current value as a current detection value based on a voltage change from the reference voltage.

Here, an appropriate value of the reference voltage is not necessarily the same both in the case of executing the PWM control on the inverter and the case of suspending the PWM control on the inverter. Under the condition that the PWM control on the inverter is suspended along with the abnormal energization, if the reference voltage that adopts the PWM control is used, current detection might involve an error.

Thus, a memory of electronic control unit 150 memorizes a first reference voltage of when executing the PWM control on the inverter and a second reference voltage of when suspending the PWM control on the inverter. In the case of executing the PWM control on the inverter, electronic control unit 150 chooses the first reference voltage. In the case of suspending the PWM control on the inverter, the electronic control unit chooses the second reference voltage. In this way, the electronic control unit calculates a current value as a current detection value based on the voltage change from the chosen reference voltage.

As described above, the reference voltage is switchingly chosen for the case of executing the PWM control on the inverter and the case of suspending the PWM control on the inverter, whereby the accuracy of current detection can be improved in either case.

After switching the reference voltage for current detection in step S508, electronic control unit 150 proceeds to step S509 to calculate a braking torque generated in the first energization system.

Electronic control unit 150 calculates values of currents flowing into each phase, from the outputs from current sensors 301UA, 301VA, and 301WA based on the reference voltage chosen in step S508. Moreover, the electronic control unit calculates a d-axis actual current value $I_d1$ and a q-axis actual current value $I_q1$ of the first energization system based on the current detection values at each phase, hereby calculating the braking torque generated in the first energization system based on the d-axis actual current value $I_d1$ and the q-axis actual current value $I_q1$. More specifically, electronic control unit 150 calculates a braking current based on outputs from current sensors 301 and then calculates a braking torque based on the braking current.

As described above, the braking torque is calculated based on the braking current detected by current sensors 301, whereby even if the impedance varies at the short-circuited portion, for example, the braking torque can be calculated with high accuracy. The accuracy of motor control, suppressing an influence of the braking torque, can be improved.

After calculating the braking torque generated in the first energization system in step S509, electronic control unit 150 proceeds to step S510 to add the total target assist torque calculated in step S501 to the braking torque calculated in step S509, hereby setting the resultant to a final target assist torque.

In other words, when attempting to generate the total target assist torque calculated in step S501 by controlling energization to the second energization system, an actual motor torque is reduced by the braking torque generated in the first energization system.

In view of the above, the target assist torque is increased by the braking torque in advance, whereby a desired target assist torque can be actually generated. Hence, even if abnormal energization occurs in either the first energization system or the second energization system and a braking torque is generated in the energization system involving the abnormal energization, a desired assist toque or equivalent torque can be generated to avoid lowering the steering control performance due to the abnormal energization.

Note that electronic control unit 150 can make correction to reduce the braking torque calculated in step S509 and then add the reduced braking toque to the total target assist torque calculated in step S501. Also in this case, it is possible to suppress reduction in motor torque, which will occur with the braking torque generated in the first energization system (in other words, avoid such a situation that an actual toque falls below a requested torque).

Next, electronic control unit 150 proceeds to step S511 to set the second energization system as a target for PWM control, which will be executed based on the target assist torque set in step S510.

In other words, if abnormal energization occurs in the first energization system, the PWM control on first inverter 1A of the first energization system is suspended, and the duty ratio of PWM control on each switching element in second inverter 1B is controlled so that currents flow into each coil of second coil set 2B at the d-axis current command value $I_d^*$ and the q-axis current command value $I_q^*$ corresponding to the target assist torque.

Here, electronic control unit 150 sets the target assist torque for the PWM control of second inverter 1B as an added value of the total target assist torque and the braking torque.

On the other hand, after determining that any fault occurs in the second energization system in step S503, electronic control unit 150 proceeds to step S512. Similar to step S507, according to the control pattern illustrated in FIG. 6, 7, 9, or 10, the electronic control unit executes ON/OFF control on each switching element of second inverter 1B in the second energization system.

Then, electronic control unit 150 proceeds to step S513. Similar to step S508, the electronic control unit switches a reference voltage for current detection, which is determined based on outputs from current sensors 301UB, 301VB, and 301WB that detect a phase current in the second energization system involving abnormal energization, to a value of when executing the PWM control unlike a value of when suspending the PWM control.

Next, electronic control unit 150 proceeds to step S514. Similar to step S509, the electronic control unit calculates currents flowing in each phase of the second energization system based on outputs from current sensors 301UB, 301VB, and 301WB. Moreover, the electronic control unit calculates a d-axis actual current value $I_d2$ and a q-axis actual current value $I_q2$ of the second energization system based on the current detection values at each phase. The electronic control unit calculates a braking torque generated in the second energization system based on the d-axis actual current value $I_d2$ and the q-axis actual current value $I_q2$. In other words, electronic control unit 150 calculates a braking current based on outputs from the current sensors 301 and calculates a braking current based on the braking torque.

Then, electronic control unit 150 proceeds to step S515 to make correction to increase the total target assist torque according to a braking torque generated in the second energization system, and sets the resultant as a final target assist torque. Then, the electronic control unit proceeds to step S516 to choose the first energization system as a control target, which will be controlled according to the target assist torque set in step S515. The electronic control unit executes PWM control on the switching element of first inverter 1A according to the target assist torque.

Hence, if the first energization system is normally operating and the second energization system suffers from abnormal energization, electronic control unit 150 suspends the PWM control on second inverter 1B of the second energization system, and then controls the duty ratio of PWM control on each switching element of first inverter 1A so that currents flow in each coil of first coil set 2A at the d-axis current command value $I_d^*$ and the q-axis current command value $I_q^*$ corresponding to the target assist torque.

Here, electronic control unit 150 sets the target assist torque for the PWM control on first inverter 1A as an added value of the total target assist torque and the braking torque.

Furthermore, after determining that any fault occurs in the second energization system as well as the first energization system in step S506, electronic control unit 150 proceeds to step S517 to execute control to turn OFF all switching elements of first inverter 1A and all switching elements of second inverter 1B and in addition, turn OFF the power supply relays 304A and 304B both, hereby stopping the driving of electric motor 130.

FIG. 11 is a schematic diagram illustrating the correlation between the total target assist torque and the target assist torque shared between the first energization system and the second energization system in two patterns: the case where the first energization system and the second energization system are both normally operating and the case where any fault occurs in the first energization system.

As illustrated in FIG. 11, if the first energization system and the second energization system are both normally operating, a half of the total target assist torque is assigned to the first energization system and the remaining to the second energization system so that the motor torque generated by controlling energization to the first energization system and the motor torque generated by controlling energization to the second energization system can sum up to the total target assist torque.

On the other hand, for example, in case the abnormal energization occurs in the first energization system, the driving of the motor with the first energization system is suspended, but a braking torque as a negative torque is generated in the first energization system. Thus, the electronic control unit sets as the target assist torque for the second energization system, the total sum of the total target assist torque and the absolute value of the braking torque. The electronic control unit causes the second energization system to drive the motor so as to generate a motor torque corresponding to the total target assist torque and a torque enough to cancel out the braking torque.

Here, in electric power steering device 100, electric motor 130 intentionally generates a braking force in some cases such as turning the steering wheel back to the neutral position.

Figure 12:
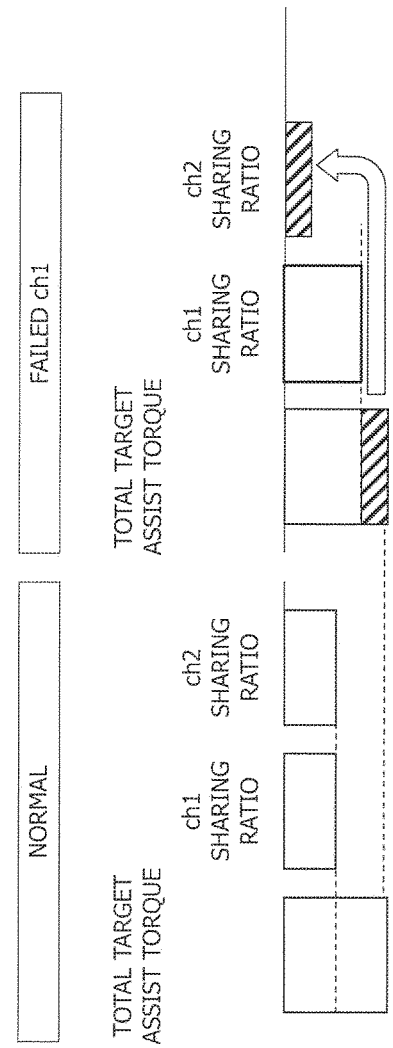
FIG. 12 is an explanatory view illustrating an example of setting a target assist torque for each energization system in case of abnormal energization according to an embodiment of the present invention.

FIG. 12 is a schematic diagram illustrating the correlation between the total target assist torque and the target assist torque shared between the first energization system and the second energization system in the case where electric motor 130 intentionally generates a braking force.

When electric motor 130 generates a braking force, the total target assist torque is set as a negative torque. If the first energization system and the second energization system are normally operating, a half of the total target assist torque is assigned to the first energization system and the remaining to the second energization system so that a negative motor torque generated by controlling energization to the first energization system and a negative motor torque generated by controlling energization to the second energization system can sum up to the total target assist torque.

On the other hand, for example, if any fault occurs in the first energization system, the driving of the motor with the first energization system is suspended, but the first energization system generates a braking force as a negative torque.

Thus, the target braking torque is reduced by the braking torque generated in the first energization system, and the resultant is set as the target braking torque to be generated by driving the motor with the second energization system. The electronic control unit executes control so that the braking torque generated in the first energization system and the braking torque intentionally generated by driving the motor with the second energization system sum up to the target braking torque.

Note that in order to suppress the excessive generation of a braking torque, which results from an error in detecting a braking torque generated in the energization system the PWM control on which is to be suspended due to the abnormal energization, a calculation result of the braking torque generated in the energization system suffering from the abnormal energization is corrected to increase. The increased braking torque is subtracted from the total sum. The resultant can be used as a target braking torque for energization control over a normal energization system.

Figure 13:
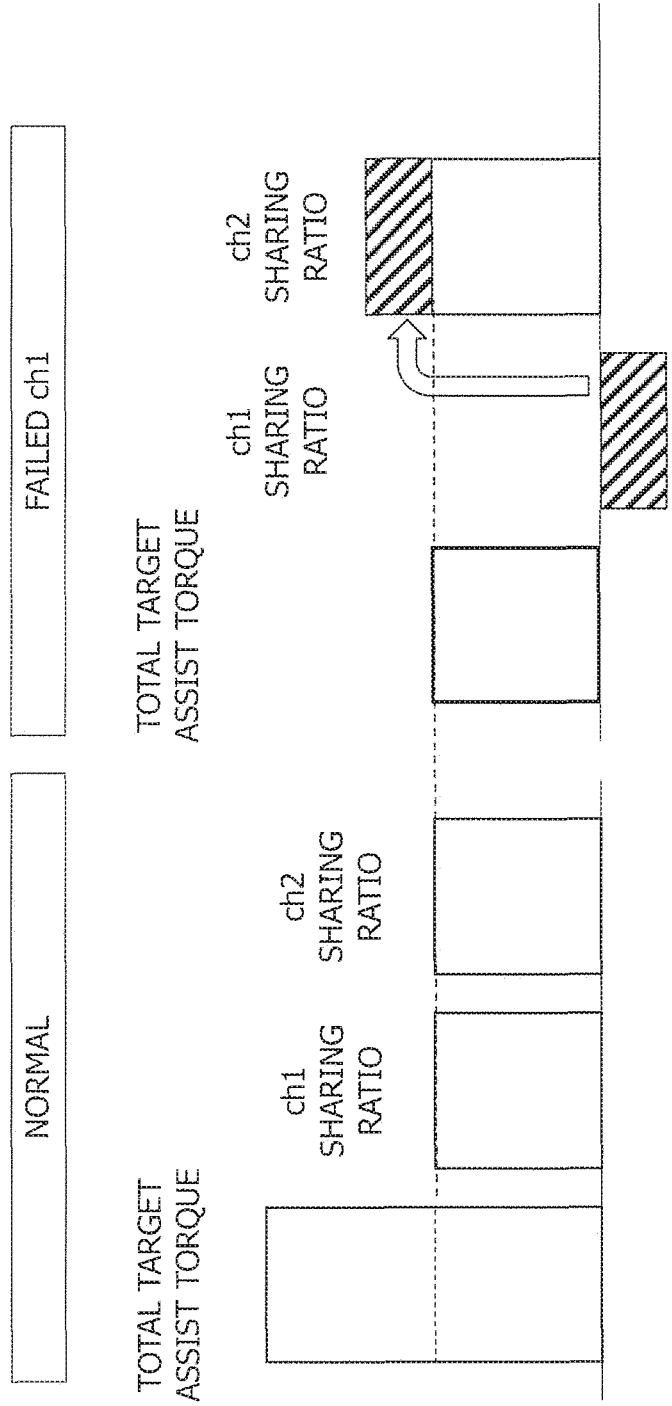
FIG. 13 is an explanatory view illustrating an example of setting a target assist torque for each energization system in case of abnormal energization according to an embodiment of the present invention.

As illustrated in FIG. 13, the total target assist torque can be different in the cases where both the first energization system and the second energization system are normally operating and where either the first energization system or the second energization system suffers from any fault.

In the illustrated example of FIG. 13, electronic control unit 150 sets the total target assist torque of when either the first energization system or the second energization system suffers from any fault, as a half of the total target assist torque of when both the first energization system and the second energization system are normally operating. For example, if the first energization system suffers from any fault, electronic control unit 150 defines as the target assist torque for the second energization system, the total sum of the half of the total target assist torque obtained under the normal condition and the absolute value of the braking torque generated in the first energization system.

Note that in the configuration that the total target assist torque of when either the first energization system or the second energization system suffers from any fault is set lower than the total target assist torque of when both the first energization system and the second energization system are normally operating, the reduction rate of the total target assist torque is not limited to 50% and can be, needless to say, arbitrarily determined.

In addition, the total target braking torque can be different in the cases where both the first energization system and the second energization system are normally operating and where either the first energization system or the second energization system suffers from any fault.

Furthermore, the present invention is not limited to the configuration that if both the first energization system and the second energization system are normally operating, the target assist torque for the first energization system and that for the second energization system are set to a half of the total target assist torque. Instead of this configuration, it is possible to increase the target assist torque of the system having completed the initial diagnosis ahead of the other at the startup or change the sharing ratio of the total target assist torque according to the temperature levels of first inverter 1A and second inverter 1B.

Next, a description is given of an embodiment where each inverter is controlled based on the determinations on each energization system as to whether abnormal energization occurs and as to whether any fault occurs in each current sensor.

Figure 14:
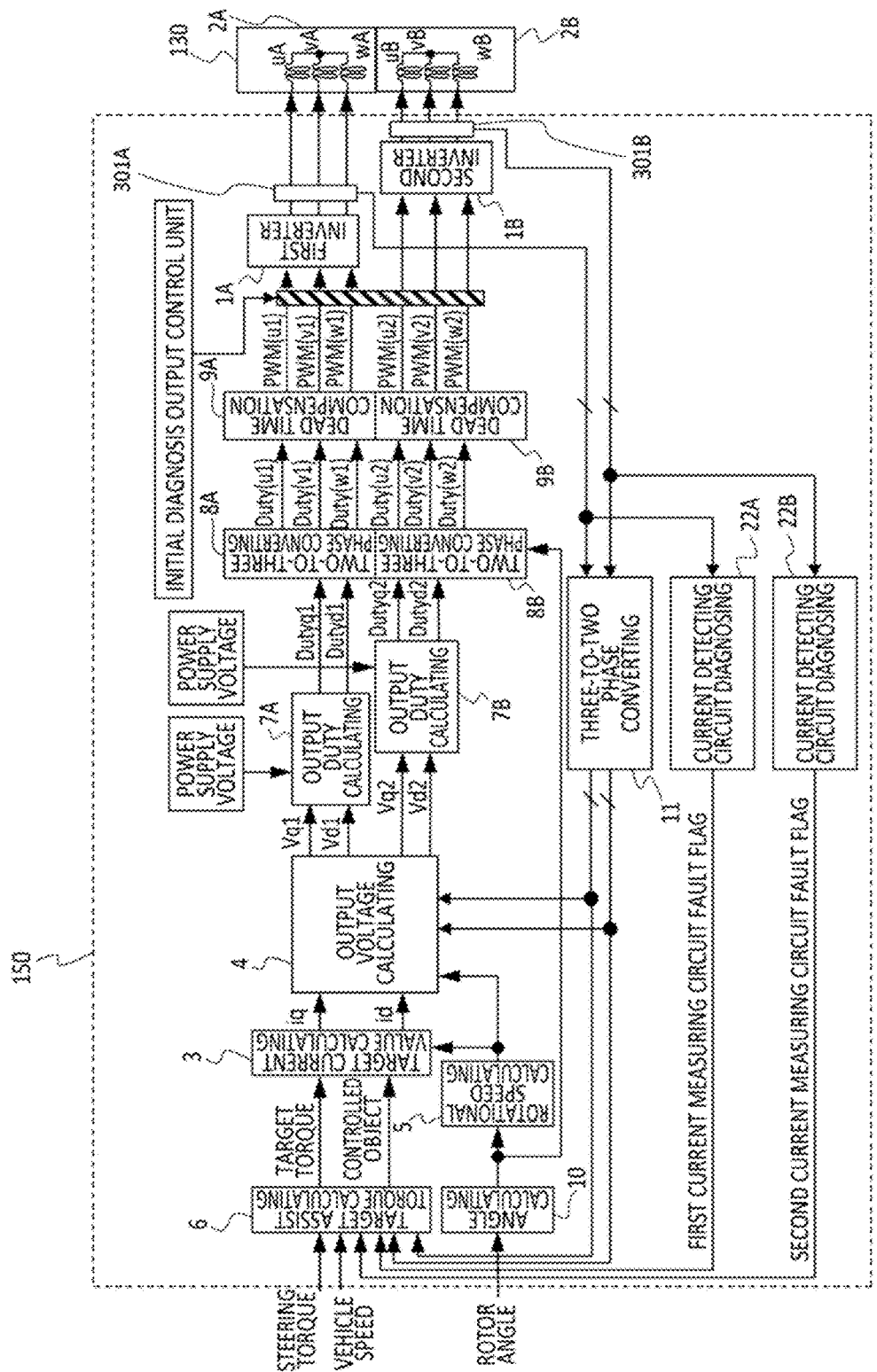
FIG. 14 is a functional block diagram of a drive controller according to an embodiment of the present invention.

FIG. 14 is a functional block diagram of microcomputer 302 having a fault diagnosis function for diagnosing the current sensor.

The functional block diagram of FIG. 14 differs from that of FIG. 4 in that a first current detecting circuit diagnosing unit 22A and a second current detecting circuit diagnosing unit 22B are added, and a target assist torque calculating unit 20 has a function of separately outputting a signal indicating a target assist torque for the first energization system and a signal indicating a target assist torque for the second energization system.

Here, first current detecting circuit diagnosing unit 22A and second current detecting circuit diagnosing unit 22B make a diagnosis as to whether any fault occurs in current sensors 301 for the first energization system and whether any fault occurs in current sensors 301 for the second energization system, and then output a signal indicating the diagnosis to target assist torque calculating unit 20. First current detecting circuit diagnosing unit 22A and second current detecting circuit diagnosing unit 22B make a diagnosis as to whether any fault occurs in current sensors 301 based on the output from each current sensor 301, for example, in the case where a switching element of the inverter is turned ON/OFF according to a fault diagnosis mode.

Figure 15:
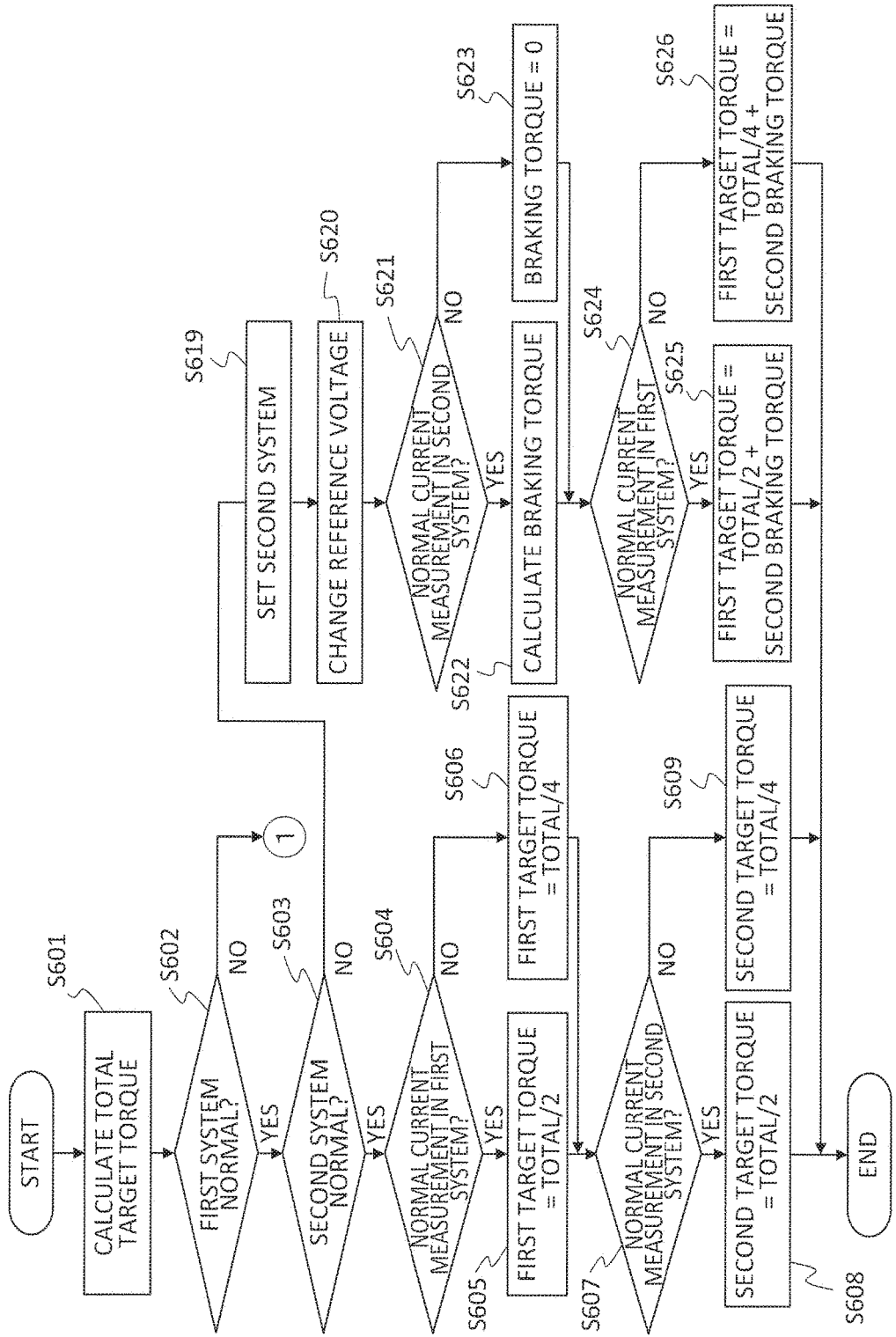
FIG. 15 is a flowchart illustrating the processing flow for individual types of abnormal energization and abnormal current detection according to an embodiment of the present invention.

The flowcharts of FIGS. 15 and 16 illustrate a flow of controlling the driving of the electric motor 130 based on whether any fault occurs in any current sensor and whether abnormal energization occurs in each energization system. This control is executed by electronic control unit 150.

In the flowcharts of FIGS. 15 and 16, electronic control unit 150 calculates the total target assist torque based on a steering torque detected by steering torque sensor 120 in step S601 and information about the vehicle speed.

Next, electronic control unit 150 proceeds to step S602 to determine whether the first energization system is normally operating without involving abnormal energization.

If the first energization system is normally operating, electronic control unit 150 proceeds to step S603 to determine whether the second energization system is normally operating without involving abnormal energization.

Then, if the first energization system and the second energization system are normally operating without involving a short-circuit of any switching element, a short-to-supply of any drive line, or a short-to-ground of any drive line, electronic control unit 150 proceeds to step S604 to determine whether all current sensors 301UA, 301VA, and 301WA for detecting a current in the first energization system are normally operating.

Here, in the case where all current sensors 301UA, 301VA, and 301WA are normally operating to detect a current in the first energization system, electronic control unit 150 proceeds to step S605 to set a target assist torque for the first energization system as a half of the total target assist torque so as to generate a motor torque corresponding to the half of the total target assist torque by controlling energization to the first energization system.

On the other hand, if any error occurs upon the current detection in the first energization system, i.e., at least one of current sensors 301UA, 301VA, and 301WA suffers from any fault, electronic control unit 150 proceeds to step S606 to set the target assist torque for the first energization system to ¼ of the total target assist torque.

If the target assist torque for the first energization system is set as described above, electronic control unit 150 proceeds to step S607 to determine whether all of current sensors 301UB, 301VB, and 301WB for detecting a current in the second energization system are normally operating.

Here, if all current sensors 301UB, 301VB, and 301WB are normally operating and thus can normally detect a current in the second energization system, electronic control unit 150 proceeds to step S608 to set the target assist torque for the second energization system to a half of the total target assist torque so as to generate a motor torque corresponding to the half of the total target assist torque by controlling energization to the second energization system.

Meanwhile, if any error occurs upon the current detection in the second energization system, i.e., at least one of current sensors 301UB, 301VB, and 301WB involves any fault, electronic control unit 150 proceeds to step S609 to set the target assist torque for the second energization system to ¼ of the total target assist torque.

If current sensor 301 involves any fault to disable detecting an actual phase current, it is impossible to execute feedback control based on comparisons between d-axis current command value $I_d^*$ and d-axis actual current value $I_d$ and between q-axis current command value $I_q^*$ and q-axis actual current value $I_q$, whereby the accuracy of controlling the motor torque is lowered.

To overcome it, electronic control unit 150 reduces the target assist torque for the energization system involving any error in current detection compared to the torque of when the current can be normally detected, hereby suppressing the excessive generation of an assist torque.

Note that the target assist torque for the energization system involving any error in current detection is not limited to ¼ of the total target assist torque, and electronic control unit 150 can appropriately set the target assist torque for the energization system involving any error in current detection to any value smaller than ½ of the total target assist torque.

On the other hand, if abnormal energization occurs in the first energization system, electronic control unit 150 proceeds from step S602 to step S610 to determine whether the abnormal energization occurs in the second energization system.

Here, if the second energization system is free from abnormal energization, i.e., if the first energization system suffers from abnormal energization while the second energization system is normally operating, electronic control unit 150 proceeds to step S611 to control, similar to step S507 above, the switching elements constituting first inverter 1A in the first energization system involving the abnormal energization according to a predetermined control pattern, hereby stopping PWM control over first inverter 1A, i.e., the switching operation.

Next, electronic control unit 150 proceeds to step S612 to switch, similar to step S508, a reference voltage used for detecting a current based on outputs from current sensors 301UA, 301VA, and 301WA that detect a phase current in the first energization system involving the abnormal energization, from a value of when first inverter 1A is under PWM control to a value of when PWM control is suspended.

Next, electronic control unit 150 proceeds to step S613 to determine whether all current sensors 301UA, 301VA, and 301WA for detecting a current in the first energization system are normally operating.

If all current sensors 301UA, 301VA, and 301WA are normally operating, electronic control unit 150 proceeds to step S614 to calculate, similar to step S509, the braking torque generated in the first energization system based on the braking currents detected by current sensors 301UA, 301VA, and 301WA.

On the other hand, if any one of current sensors 301UA, 301VA, and 301WA involves any fault, electronic control unit 150 cannot calculate the braking torque based on the detected braking current and thus proceeds to step S615 to set to a fixed value the braking torque generated in the first energization system.

Note that in step S615, the fixed value of the braking torque can be set to, for example, zero.

Alternatively, in step S615, electronic control unit 150 can calculate a braking torque from the motor rotational speed.

After calculating the braking torque generated in the first energization system, electronic control unit 150 proceeds to step S616 to determine whether all current sensors 301UB, 301VB, and 301WB for detecting a current in the second energization system are normally operating.

If all current sensors 301UB, 301VB, and 301WB are normally operating, during the PWM control over the second energization system, feedback control can be executed based on comparison between an actual current value and a current command value, hereby controlling the motor torque with high accuracy.

Hence, if all of current sensors 301UB, 301VB, and 301WB are normally operating, electronic control unit 150 proceeds from step S616 to step S617 to set the target assist torque for the second energization system to a value obtained by adding ½ of the total target assist torque and an absolute value of the braking torque for the first energization system.

On the other hand, if any one of current sensors 301UB, 301VB, and 301WB involves any fault, the accuracy of controlling the motor torque with the second energization system is lowered. Then, electronic control unit 150 proceeds from step S616 to step S618 to set the target assist torque for the second energization system to a value obtained by adding ¼ of the total target assist torque and an absolute value of the braking torque for the first energization system.

Here, at the time of calculating the target assist torque for the second energization system in step S617 or step S618, in case any fault occurs in the current sensor of the first energization system, electronic control unit 150 sets the braking torque generated in the first energization system to, for example, zero, hereby avoiding such a situation that the target assist torque for the second energization system is set high based on the braking torque higher than actual.

Accordingly, instead of the configuration where the braking torque used for correcting the target assist torque for the second energization system is set to zero in case any fault occurs in the current sensor of the first energization system, the target assist torque for the second energization system can be corrected to a value expected to fall below the actual braking torque.

In addition, if the first energization system does not involve abnormal energization, whereas the second energization system involves abnormal energization, electronic control unit 150 proceeds from step S603 to step S619.

In step S619, electronic control unit 150 controls, similar to step S512, the switching elements constituting second inverter 1B in the second energization system involving the abnormal energization according to a predetermined control pattern so as to stop PWM control over second inverter 1B, i.e., switching operation.

Next, electronic control unit 150 proceeds to step S620 to switch, similar to step S513, a reference voltage used for detecting a current based on outputs from current sensors 301UB, 301VB, and 301WB that detect a phase current in the second energization system involving the abnormal energization, from a value of when the second inverter 1B is under PWM control to a value of when PWM control is suspended.

Next, electronic control unit 150 proceeds to step S621 to determine whether all of current sensors 301UB, 301VB, and 301WB for detecting a current in the second energization system are normally operating.

If all current sensors 301UB, 301VB, and 301WB are normally operating, electronic control unit 150 proceeds to step S622 to calculate, similar to step S514, a braking torque generated in the second energization system based on a braking current detected by current sensors 301UB, 301VB, and 301WB.

On the other hand, if any one of current sensors 301UB, 301VB, and 301WB involves any fault, electronic control unit 150 cannot calculate a braking torque based on a detection value of a braking current and thus proceeds to step S623 to set a braking torque generated in the second energization system to a fixed value.

Note that in step S623, the fixed value for the braking torque may be set to, for example, zero.

Furthermore, in step S623, electronic control unit 150 can calculate a braking torque from the motor rotational speed.

After calculating the braking torque generated in the second energization system, electronic control unit 150 proceeds to step S624 to determine whether all current sensors 301UA, 301VA, and 301WA for detecting a current in the first energization system are normally operating.

If all current sensors 301UA, 301VA, and 301WA are normally operating, during the PWM control over the first energization system, it is possible to execute feedback control based on comparison between an actual current value and a current command value, whereby the motor torque can be controlled with high accuracy.

Then, if all current sensors 301UA, 301VA, and 301WA are normally operating, electronic control unit 150 proceeds from step S624 to step S625 to set the target assist torque for the first energization system to a value obtained by adding ½ of the total target assist torque and an absolute value of the braking torque for the second energization system.

On the other hand, if any one of current sensors 301UA, 301VA, and 301WA involves any fault, the accuracy of controlling the motor torque with the first energization system is lowered. Thus, electronic control unit 150 proceeds from step S624 to step S626 to set the target assist torque for the first energization system to a value obtained by adding ¼ of the total target assist torque and an absolute value of the braking torque for the second energization system.

In other words, at the time of PWM control on the energization system not suffering from abnormal energization, if any current sensor in the energization system involves any fault, the accuracy of controlling the motor torque lowers compared to the normally operating current sensor, electronic control unit 150 sets the target assist torque lower than that of when the current sensor is normally operating.

In addition, if the first energization system and the second energization system suffer from abnormal energization, electronic control unit 150 proceeds from step S610 to step S627 to execute control to turn OFF all of the switching elements constituting first inverter 1A for first energization system and all of the switching elements constituting second inverter 1B for the second energization system and in addition, to turn OFF both power supply relays 304A and 304B, hereby suspending the PWM control over the first energization system and the second energization system, i.e., the switching operation.

As described above, if the target assist torque is set and the braking torque is calculated according to the fault diagnosis on current sensors 301, in case of any fault in current sensors 301, the motor torque is not controlled more than necessary by mistake, and the assist torque can be continuously generated. Accordingly, in electric power steering device 100, the performance of steering control is hardly lowered.

FIG. 17 schematically illustrates the circuit operation against abnormal energization and abnormal current detection when the control processing of FIGS. 15 and 16 is executed.

In FIG. 17, the abnormal energization is categorized into four patterns: a pattern that the first energization system and the second energization system are normally operating; a pattern that the first energization system involves an abnormality, while the second energization system is normally operating; a pattern that the first energization system is normally operating, while the second energization system involves an abnormality; and a pattern that the first energization system and the second energization system involve an abnormality.

Moreover, in FIG. 17, the abnormal current detection is classified into four patterns: a pattern that current detection in the first energization system and that in the second energization system are normally performed; a pattern that the current detection in the first energization system involves an error, while the current detection in the second energization system is normally performed; a pattern that the current detection in the first energization system is normally performed, while the current detection in the second energization system involves an error; and a pattern that the current detection in the first energization system and that in the second energization system both involve an error.

In FIG. 17, set values for the target assist torque are illustrated for each combination between the four patterns of abnormal energization and the four patterns of abnormal current detection. In FIG. 17, regarding the left and right parts in each cell indicating the combination between the patterns of the abnormal energization and the patterns of the abnormal current detection, the left part indicates the controlled state of the first energization system and the right part indicates the controlled state of the second energization system.

If the first energization system and the second energization system are normally operating without abnormal energization such as a short-circuit, a short-to-ground, or a short-to-supply. A half of the total target assist torque is set as the target assist torque for the energization system not involving the abnormal current detection, and ¼ of the total target assist torque is set as the target assist torque for the energization system involving the abnormal current detection.

Furthermore, if the first energization system involves an abnormality, while the second energization system is normally operating, the switching elements in the first energization system are controlled, for example, according to the control pattern that turns all the elements OFF so as to stop PWM control (switching operation). As a result, the first energization system generates a braking torque.

On the other hand, the target assist torque for the second energization system is set, as a standard value, to a half of the total target assist torque when the current detection in the second energization system is normally performed. If the current detection in the second energization system involves an error, the target assist torque is set, as a standard value, to ¼ of the total target assist torque. If the current detection in the first energization system is normally performed, a braking torque calculated from the detected braking current is added to the standard value. If the current detection in the first energization system involves an error, the braking torque is assumed to be, for example, zero, and the standard value is used as a final target value as it is.

In contrast, if the first energization system is normally operating, while the second energization system involves an abnormality, the switching elements in the second energization system are controlled, for example, according to the control pattern that turns all the elements OFF so as to stop PWM control (switching operation). As a result, the second energization system generates a braking torque.

On the other hand, the target assist torque of the first energization system is set, as a standard value, to a half of the total target assist torque if the current detection in the first energization system is normally performed. If the current detection in the first energization system involves an error, the target assist torque is set, as a standard value, to ¼ of the total target assist torque. If the current detection in the second energization system is normally performed, a braking torque calculated from a detection value of a braking current is added to the standard value. If the current detection in the second energization system involves an error, the braking torque is assumed to be, for example, zero and the standard value is used as a final target value as it is.

Moreover, if the first energization system and the second energization system both involve abnormal energization, regardless of whether the current detection involves an error, the switching elements of the first energization system and those of the second energization system are controlled to turn OFF so as to stop driving the motor.

Hereinbefore, the present invention is described in detail on the basis of the preferred embodiments but it is obvious that one skilled in the art can make various modifications within the basic technical ideas and teachings of the present invention.

The above drive controller and control method are applicable to an electric motor where three-phase coils U, V, and W are connected by means of delta connection as well as electric motor 130 having three-phase coils U, V, and W star-connected.

Figure 18:
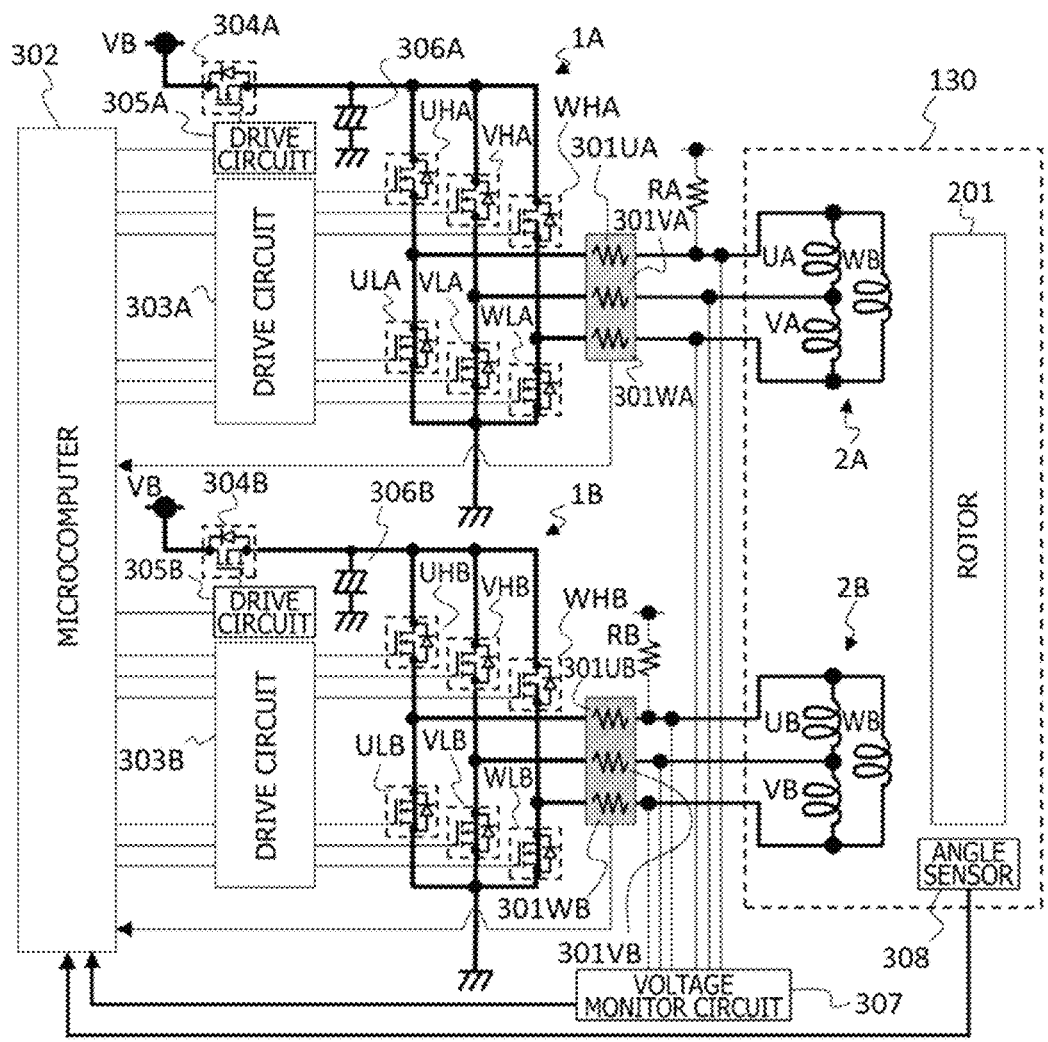
FIG. 18 is a circuit diagram illustrating the layout of current sensors in a delta-connected motor according to an embodiment of the present invention.
Figure 19:
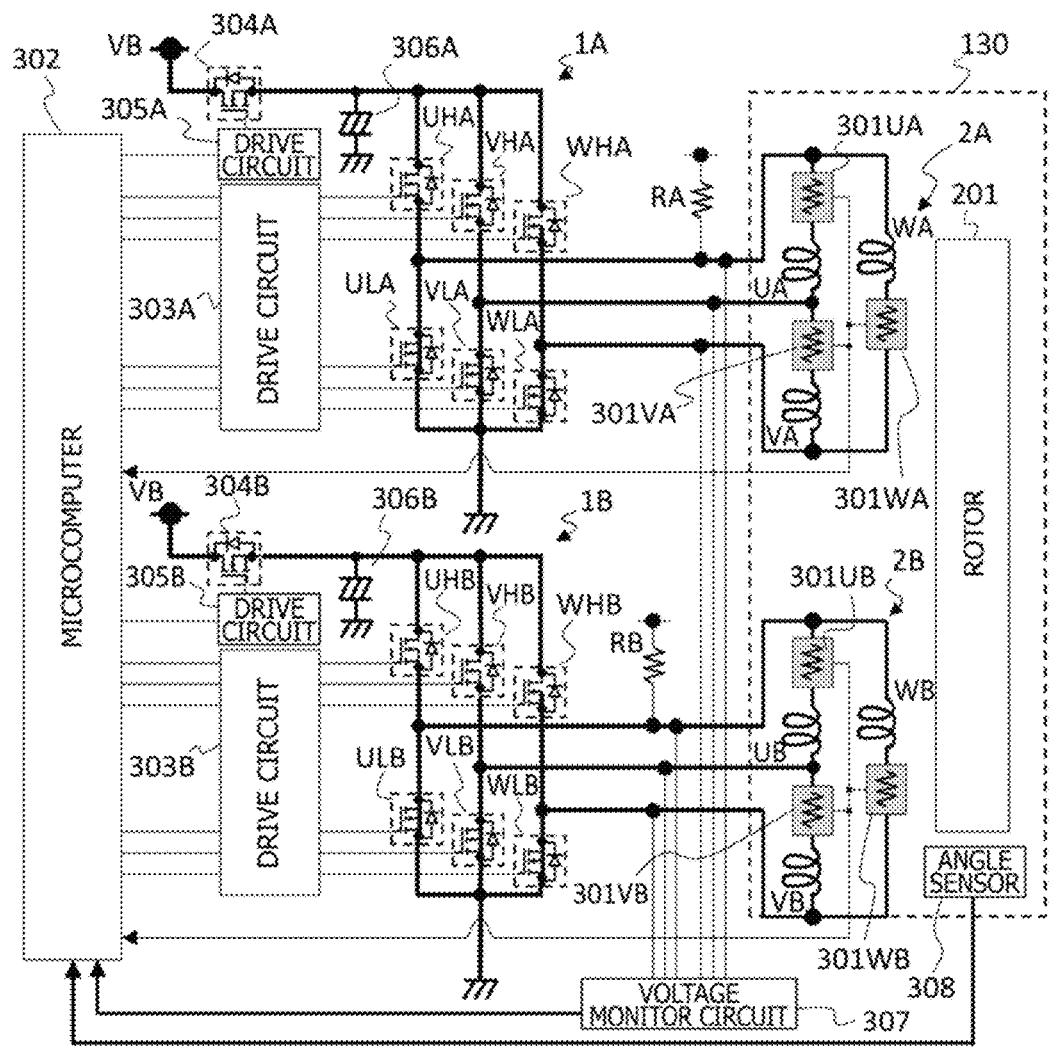
FIG. 19 is a circuit diagram illustrating the layout of current sensors in a delta-connected motor according to an embodiment of the present invention.

FIGS. 18 and 19 illustrate the layout of current sensors 301 in the electric motor including delta-connected three-phase coils U, V, and W.

In the illustrated example of FIG. 18, current sensors 301U, 301V, and 301W are disposed between the output points of inverters 1A and 1B and connection points among the delta-connected three-phase coils U, V, and W. Furthermore, in the illustrated example of FIG. 19, current sensors 301U, 301V, and 301W are disposed between the connection points among three-phase coils U, V, and W and the delta-connected coils U, V, and W.

Moreover, the power supply relay can be provided on each drive line connecting between each connection point (output point of the inverter) among low-potential side semiconductor switches UL, VL, and WL and high-potential side semiconductor switches UH, VH, and WH, and each of three-phase coils U, V, and W.

Furthermore, the above drive controller is applicable as well to an apparatus equipped with three or more coil sets including three-phase coils U, V, and W and three or more inverters for driving the respective coil sets.

Furthermore, the electric motor to which the drive controller of the present invention is applied is not limited to the electric motor that generates a steering assist force in a vehicle electric power steering device but is applicable to various electric motors such as an electric motor serving as an actuator for a variable valve mechanism of an engine and an electric motor used for driving a pump.

In addition, if any one of plural energization systems involves abnormal energization, a warning device such as a warning lamp or buzzer can be operated to inform a driver of the vehicle about an abnormality etc. in an electric power steering device incorporating the electric motor.

In addition, if an abnormality occurs in any current sensor, PWM control (switching operation) on an inverter including the current sensor can be suspended.

REFERENCE SYMBOL LIST 1A first inverter
1B second inverter
2A first coil set
2B second coil set
3 target current value calculating unit
4 output voltage calculating unit
5 motor rotational speed calculating unit
6 target assist torque calculating unit
7A first output duty calculating unit
7B second output duty calculating unit
8A first two-to-three phase converting unit
8B second two-to-three phase converting unit
9A first dead time compensation unit
9B second dead time compensation unit
11 three-to-two phase converting unit
130 electric motor
150 electronic control unit
301UA, 301VA, 301WA, 301UB, 301VB, 301WB current sensor
302 microcomputer
304A, 304B power supply relay
307 voltage monitor circuit
UHA, VHA, WHA, UHB, VHB, WHB high-potential side switching element
ULA, VLA, WLA, ULB, VLB, WLB low-potential side switching element

The invention claimed is:

1. A drive controller, comprising:
an electric motor equipped with a plurality of energization systems composed of an inverter and coils corresponding to a plurality of phases, the plurality of energization systems including at least a first energization system and a second energization system;
a current detecting unit configured to detect currents between the coils and output points of the inverter or between the coils and a connection point between the coils, in each of the plurality of energization systems; and
a microcomputer configured to obtain a detection value of a current from the current detecting unit and output a control signal of the inverter to each of the plurality of energization systems, the microcomputer being configured to
control, when abnormal energization occurs in the first energization system, the inverter of the first energization system into a predetermined condition; and
detect a torque generated in the first energization system based on a current in the first energization system detected by the current detecting unit; and
control at least the inverter of the second energization system based on the torque generated in the first energization system.

2. The drive controller according to claim 1, wherein the microcomputer is configured to control a normal inverter based on the torque detected by the microcomputer.

3. The drive controller according to claim 1,
wherein the inverter comprises a high-potential side switching element and a low-potential side switching element, and
wherein the microcomputer is configured to turn ON at least one of the high-potential side switching element or the low-potential side switching element of the inverter of the first energization system.

4. The drive controller according to claim 1, further comprising a diagnosing unit configured to diagnose whether the current detecting unit in the first energization system suffers from an abnormality.

5. The drive controller according to claim 1, wherein when at least the first energization system involves an abnormality, the microcomputer is configured to control a normal inverter based on whether an abnormality occurs in the current detecting unit disposed in the normal inverter and the torque detected by the microcomputer.

6. The drive controller according to claim 1, further comprising a reference voltage setting unit configured to change a reference voltage used for current detection with the current detecting unit according to whether abnormal energization occurs.

7. The drive controller according to claim 3, wherein when abnormal energization occurs in the first energization system such that a potential of one of the coils reaches a power supply potential, the microcomputer is configured to perform a control to turn ON the high-potential side switching element of the inverter in the first energization system.

8. The drive controller according to claim 3, wherein when abnormal energization occurs in the first energization system such that a potential of one of the coils reaches a power supply potential, the microcomputer is configured to perform a control to turn ON the low-potential side switching element of the inverter in the first energization system in such a manner that power supply to the first energization system is interrupted.

9. The drive controller according to claim 3, wherein when abnormal energization occurs in the first energization system such that a potential of one of the coils reaches a ground potential, the microcomputer is configured to perform a control to turn ON the low-potential side switching element of the inverter in the first energization system.

10. The drive controller according to claim 3, wherein when abnormal energization occurs in the first energization system such that a potential of one of the coils reaches a ground potential, the microcomputer is configured to perform a control to turn ON the high-potential side switching element of the inverter in the first energization system in such a manner that power supply to the first energization system is interrupted.

11. The drive controller according to claim 2, wherein the microcomputer is configured to control a normal inverter based on a torque detected by the microcomputer such that the electric motor generates a same level of torque before and after abnormal energization occurs.

12. The drive controller according to claim 2, wherein when at least the first energization system involves abnormal energization, the microcomputer is configured to control a normal inverter based on a target torque different from a target torque of when all of the energization systems are normally operating, and a torque detected by the microcomputer.

13. The drive controller according to claim 2, wherein when a fault occurs in the current detecting unit of the first energization system, the microcomputer is configured to set a detection value of a torque generated in the first energization system to a fixed value.

14. A drive control method for an electric motor equipped with a plurality of energization systems composed of an inverter and coils corresponding to a plurality of phases, the plurality of energization systems including at least a first energization system and a second energization system, the method comprising:
- causing a microcomputer to control, when the first energization system involves abnormal energization, the inverter of the first energization system into a predetermined condition;
- causing at least one current sensor to detect currents between the coils and output points of inverter of the first energization system or between the coils of the first energization system and a connection point between the coils;
- causing the microcomputer to detect a torque generated in the first energization system based on a current detected in the first energization system, and
- causing the microcomputer to control at least the inverter of the second energization system based on the torque generated in the first energization system.

15. The drive control method for an electric motor according to claim 14, further comprising:
- controlling, by the microcomputer, the inverter of the second energization system based on a detected torque.

* * * * *